(12) United States Patent
    Fulks et al.

(10) Patent No.: US 9,087,412 B2
(45) Date of Patent: Jul. 21, 2015

(54) METHOD AND APPARATUS FOR GROUPING AND DE-OVERLAPPING ITEMS IN A USER INTERFACE

(75) Inventors: Mark Travis Fulks, Danville, CA (US); Ashok Ravula, Cupertino, CA (US); Kenneth Walker, Concord, CA (US); Bamidele Adetokunbo, Dublin, CA (US); Srikanth Challa, San Jose, CA (US); Christophe Marle, San Francisco, CA (US); Aaron Licata, San Ramon, CA (US); Pankaj Jain, San Jose, CA (US); Matthew Johnson, Phoenix, AZ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 234 days.

(21) Appl. No.: 13/619,092

(22) Filed: Sep. 14, 2012

(65) Prior Publication Data
    US 2013/0093787 A1    Apr. 18, 2013

Related U.S. Application Data

(60) Provisional application No. 61/539,255, filed on Sep. 26, 2011.

(51) Int. Cl.
    *G06T 11/60* (2006.01)
    *G06T 11/00* (2006.01)
    *G06T 11/20* (2006.01)
    *G01C 21/36* (2006.01)

(52) U.S. Cl.
    CPC .................. *G06T 11/60* (2013.01); *G06T 11/00* (2013.01); *G06T 11/206* (2013.01); *G01C 21/3635* (2013.01)

(58) Field of Classification Search
    CPC .. G01C 21/3679; G01C 21/32; G01C 21/367; G01C 21/3635; G01C 21/3667; G09B 29/006
    USPC ........................ 701/532, 438, 426, 409, 455; 340/995.1, 990, 995.19, 995.24, 340/995.14; 707/E17.018, 724, 754
    See application file for complete search history.

(56) References Cited

U.S. PATENT DOCUMENTS

| | | | |
|---|---|---|---|
| 6,266,064 B1* | 7/2001 | Snyder .......................... | 345/421 |
| 7,456,848 B2* | 11/2008 | Dolph et al. .................. | 345/629 |
| 2002/0130906 A1* | 9/2002 | Miyaki ......................... | 345/837 |
| 2004/0243306 A1* | 12/2004 | Han .............................. | 701/211 |
| 2009/0315995 A1* | 12/2009 | Khosravy et al. ............. | 348/158 |
| 2011/0161875 A1* | 6/2011 | Kankainen .................... | 715/810 |
| 2011/0313657 A1* | 12/2011 | Myllymaki et al. .......... | 701/208 |
| 2012/0159301 A1* | 6/2012 | Ramamurthy et al. ....... | 715/227 |

* cited by examiner

*Primary Examiner* — Carlos Perromat
(74) *Attorney, Agent, or Firm* — Ditthavong & Steiner, P.C.

(57) ABSTRACT

An approach is provided for grouping and de-overlapping items in a user interface. A display manager determines one or more items for rendering in a user interface. The display manager then causes, at least in part, a determination of one or more rendering locations for one or more representations of the one or more items based, at least in part, on location information associated with the one or more items. The display manager further causes, at least in part, a grouping, a de-overlapping, or a combination thereof of the one or more representations based, at least in part, on an overlapping of the one or more rendering locations. The display manager also causes, at least in part, a rendering of the one or more representations in the user interface based, at least in part, on the grouping, the de-overlapping, or a combination thereof.

18 Claims, 35 Drawing Sheets

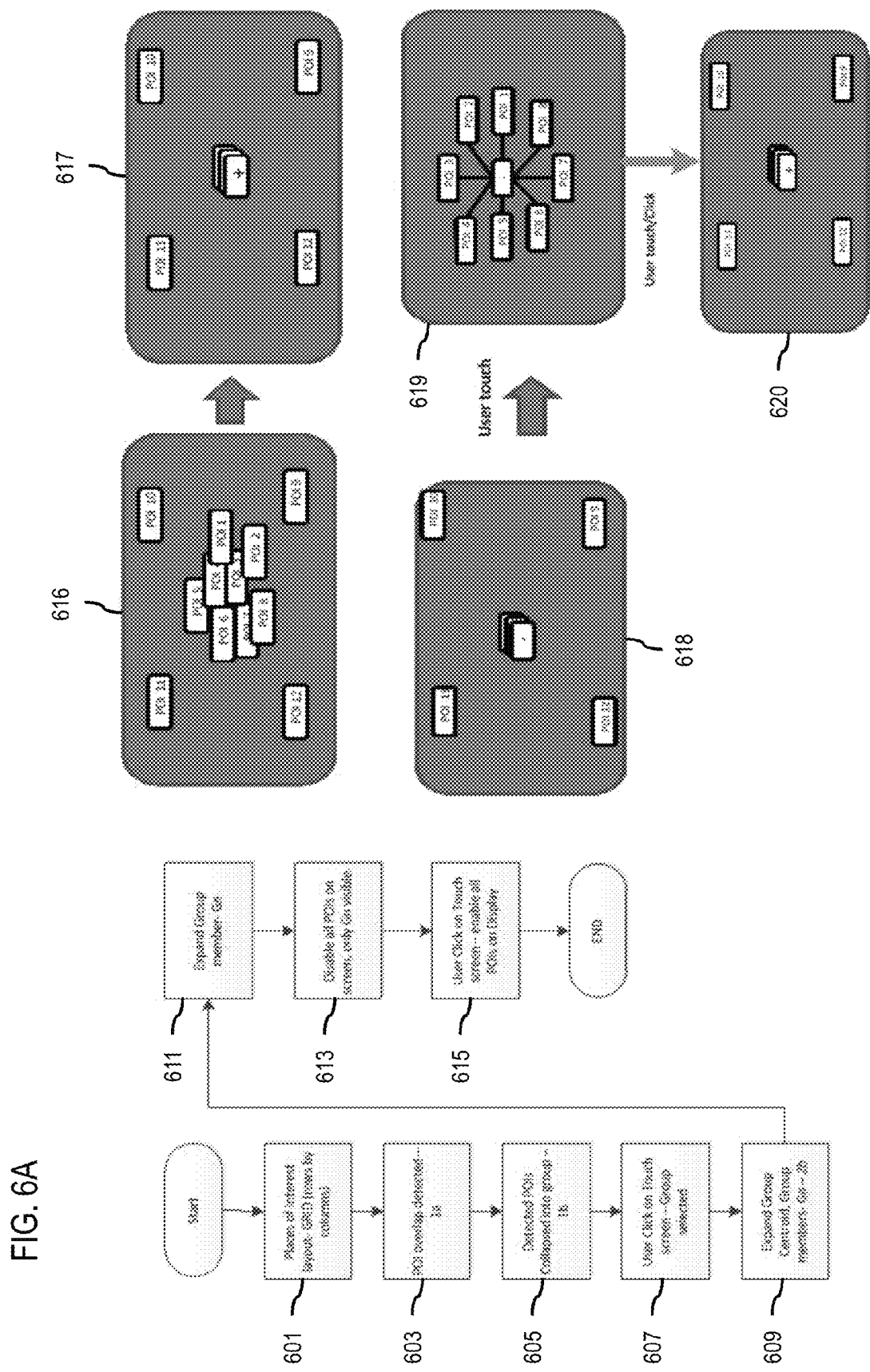

| Step | Delta-X | Delta-Y |
|---|---|---|
| 1 | -1 | 0 |
| 2 | 1 | 0 |
| 3 | 0 | 1 |
| 4 | -1 | 1 |
| 5 | 1 | 1 |
| 6 | -2 | 0 |
| 7 | 2 | 0 |
| 8 | 0 | 2 |
| 9 | -1 | 2 |
| 10 | 1 | 2 |
| 11 | -2 | 1 |
| 12 | 2 | 1 |
| 13 | 0 | 3 |
| 14 | -1 | 3 |
| 15 | 1 | 3 |
| 16 | -2 | 2 |
| 17 | 2 | 2 |

000
METHOD AND APPARATUS FOR GROUPING AND DE-OVERLAPPING ITEMS IN A USER INTERFACE

RELATED APPLICATIONS

This application claims benefit of the earlier filing date under 35 U.S.C. §119(e) of U.S. Provisional Application Ser. No. 61/539,255 filed Sep. 26, 2011, entitled "Method and Apparatus for Grouping and De-overlapping Items in a Perspective Display," the entirety of which is incorporated herein by reference.

BACKGROUND

Service providers (e.g., wireless, cellular, etc.) and device manufacturers are continually challenged to deliver value and convenience to consumers by, for example, providing compelling network services. In particular, these services can include location and navigation services on a mobile device (e.g., a smartphone). For example, mobile devices may include a display, location-based sensors (e.g., Global Positioning System (GPS) receivers), camera, and a processor, along with access to network-based databases of information. In addition, such devices can be programmed to provide a virtual view of geographic places or points of interest (POIs) and other display items surrounding the device to support augmented reality, virtual reality, three-dimensional mapping, and/or other similar perspective displays. In this context, the display of POIs can become challenging where information overload occurs on small display screens. For example, as more items are rendered in the perspective display, the representations or renderings (e.g., icons, touch buttons, thumbnails, etc.) of those items in display begin consuming the available display area which leading to obscuring, overlapping, etc. of the items. Accordingly, service providers and device manufacturers face significant technical challenges to enabling applications and services that support perspective-based displays to present POIs or other items so that users can more easily absorb and/or interact with those items. These challenges can be particularly acute on mobile devices where display, computing, memory, and/or other resources may be limited.

SOME EXAMPLE EMBODIMENTS

Therefore, there is a need for an approach for efficiently grouping and de-overlapping items (e.g., POIs) in a user interface.

According to one embodiment, a method comprises determining one or more items for rendering in a user interface. The method also comprises causing, at least in part, a determination of one or more rendering locations for one or more representations of the one or more items based, at least in part, on location information associated with the one or more items. The method further comprises causing, at least in part, a grouping, a de-overlapping, or a combination thereof of the one or more representations based, at least in part, on an overlapping of the one or more rendering locations. The method further comprises causing, at least in part, a rendering of the one or more representations in the user interface based, at least in part, on the grouping, the de-overlapping, or a combination thereof.

According to another embodiment, an apparatus comprising at least one processor, and at least one memory including computer program code for one or more programs, the at least one memory and the computer program code configured to, with the at least one processor, cause, at least in part, the apparatus to determine one or more items for rendering in a user interface. The apparatus also causes, at least in part, a determination of one or more rendering locations for one or more representations of the one or more items based, at least in part, on location information associated with the one or more items. The apparatus further causes, at least in part, a grouping, a de-overlapping, or a combination thereof of the one or more representations based, at least in part, on an overlapping of the one or more rendering locations. The apparatus further causes, at least in part, a rendering of the one or more representations in the user interface based, at least in part, on the grouping, the de-overlapping, or a combination thereof.

According to another embodiment, a computer-readable storage medium carrying one or more sequences of one or more instructions which, when executed by one or more processors, cause, at least in part, an apparatus to determine one or more items for rendering in a user interface. The apparatus also causes, at least in part, a determination of one or more rendering locations for one or more representations of the one or more items based, at least in part, on location information associated with the one or more items. The apparatus further causes, at least in part, a grouping, a de-overlapping, or a combination thereof of the one or more representations based, at least in part, on an overlapping of the one or more rendering locations. The apparatus further causes, at least in part, a rendering of the one or more representations in the user interface based, at least in part, on the grouping, the de-overlapping, or a combination thereof.

According to another embodiment, an apparatus comprises means for determining one or more items for rendering in a user interface. The apparatus also comprises means for causing, at least in part, a determination of one or more rendering locations for one or more representations of the one or more items based, at least in part, on location information associated with the one or more items. The apparatus further comprises means for causing, at least in part, a grouping, a de-overlapping, or a combination thereof of the one or more representations based, at least in part, on an overlapping of the one or more rendering locations. The apparatus further comprises means for causing, at least in part, a rendering of the one or more representations in the user interface based, at least in part, on the grouping, the de-overlapping, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A and 6B are a flowchart and diagrams of a grouping process, according to various embodiments;

FIG. 18B is a diagram of a cell search sequence for generating a perspective display, according to one embodiment;

DESCRIPTION OF SOME EMBODIMENTS

Examples of a method, apparatus, and computer program for grouping and de-overlapping items in a user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "perspective display" refers to a user interface or a portion of a user interface for presenting location-based information in a three-dimensional (3D) representation or an approximation of a 3D representation. By way of example, perspective displays are used in applications supporting augmented reality, virtual reality, mapping, navigation, and the like. Although various embodiments are described with respect to a mapping display that is an augmented reality display, it is contemplated that various embodiments of the approach described herein may be used with any other type of perspective display.

Figure 1:
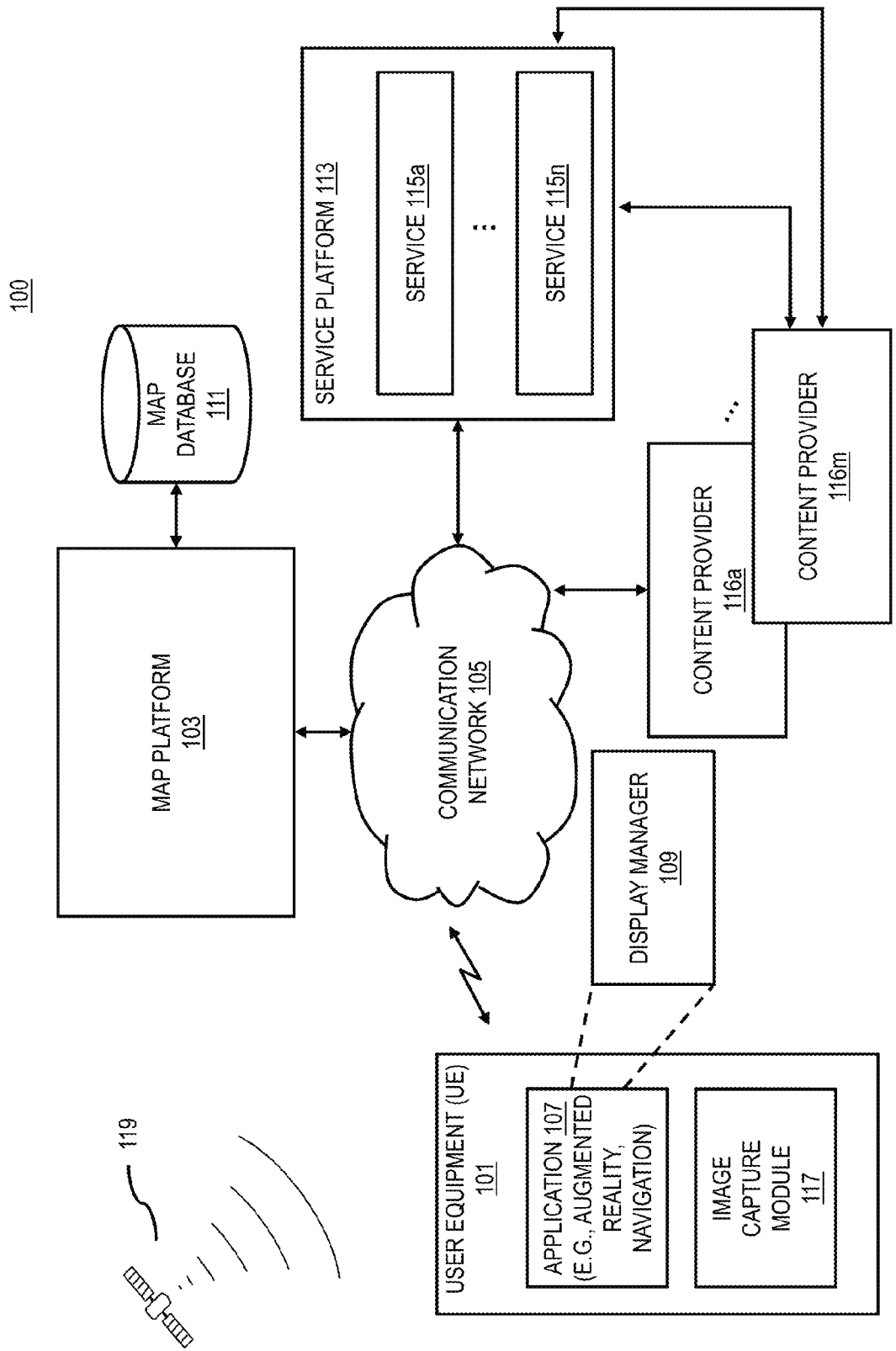
FIG. 1 is a diagram of a system capable of grouping and de-overlapping items in a user interface, according to one embodiment.

FIG. 1 is a diagram of a system capable of generating a perspective display, according to one embodiment. It is becoming increasingly popular for service providers and device manufacturers to bundle or make available navigation and mapping services on an array of user devices (e.g., mobile handsets, computers, navigation devices, etc.). Such devices may utilize location-based technologies (e.g., Global Positioning System (GPS) receivers, cellular triangulation, assisted-GPS (A-GPS), etc.) to provide navigation and mapping information. One growing trend for these services is to move beyond two-dimensional (2D) maps and provide location services based on three-dimensional (3D) maps or representations of locations and/or routes of interest. For example, modern devices may utilize an augmented reality mode to superimpose graphics and text over video images showing points of interest (POIs) in front of the user. Moreover, certain devices may utilize perspective-based displays such as 3D representations (e.g., rendered 3D models) of buildings and streets to provide navigational, mapping, or other location-based information.

However, as previously discussed, such perspective-based displays can be complex and resource intensive to generate. For example, on a device with a touch screen, virtual POIs can be displayed as touchable buttons. This typically requires that the buttons be separated and have minimum screen dimensions. On a device with a camera, the virtual POIs can be displayed over the camera's viewfinder image. In most cases, it is desired that the representations (e.g., the touch buttons, icons, graphics, etc.) of the virtual POIs appears in the vicinity of the corresponding real world locations in the user interface. In addition, in the case of a mobile device (e.g., a smartphone, mobile handset, etc.), the available display is generally limited and can quickly become cluttered when there are many elements or items (e.g., POIs) to display. This cluttered display makes it much more difficult for a user to quickly identify important information. By way of example, in an augmented reality application, multiple nearby POIs can cause clutter in the display, making it difficult (if not impossible) to see all POIs. In other words, when there is a high density of POIs in the display, graphical representations (e.g., icons, labels, etc.) depicting the POIs can overlap and obscure one another. Therefore, service providers and device manufacturers face the problem of selecting a subset of the POIs or other items and then displaying them as separate buttons appearing near their location in the viewfinder. In other embodiments, service providers and device manufacturers may face the challenge of grouping and/or de-overlapping the representations to, for instance, declutter the perspective display. In addition, particularly for mobile devices, service providers face the additional problem of implementing a perspective-base display process that has enough computational efficiency for real-time or substantially real-time display.

To address this problem, a system 100 of FIG. 1 introduces the capability of generating a perspective display (e.g., an augmented reality display) by efficiently mapping and selecting items (e.g., POIs) for generating a perspective display. More specifically, in one embodiment, the system 100 generates a perspective display by converting geographic location information (e.g., latitude and longitude coordinates) of POIs to pixel locations in a user interface. In one embodiment, the locations are converted from coordinate information (e.g., latitude and longitude) to polar coordinates relative to a viewing location (e.g., location of a mobile device in an augmented reality display or a specified viewing location in a virtual reality display). Representations of the POIs are then mapped onto a predetermined surface (e.g., a cylinder or sphere) around the device using perspective information or an approximation of the perspective information (e.g., an artistic perspective). In one embodiment, the surface can be defined to extend beyond the visible range of a particular display (e.g., extend to a 360 degree representation of the area around a viewing location such as the cylinder or sphere mentioned above).

In one embodiment, the surface is then divided into an array of cells (e.g., a grid or other like pattern). In this way, representations of the POIs can be mapped to cover one or more of the cells and then arranged among the cells so that the representations do not overlap or substantially overlap. In one embodiment, the system 100 can employ a search process to locate non-overlapping cells or block of cells for associating with the representations of the POI. In some cases, the system 100 can discard any POI that cannot be assigned an empty cell or block of cells following the search process.

In one embodiment, to avoid discarding any POIs, the system 100 can employ means for grouping and/or de-overlapping the representations of the POIs. In one embodiment, to maximize the information (e.g., representations of POIs) presented to the user, the system 100 prioritizes the de-overlapping of close POIs to avoid grouping or clustering them. Then if de-overlapping is not possible (e.g., no more available display area), the system 100 can perform grouping. It is contemplated that the system 100 can vary the degree of grouping versus de-overlapping to balance the information presented against the available display resources.

In one embodiment, the system 100 can employ variety of means to de-overlap or maximize the available display area for presenting POIs. For example, the system 100 can use POI distance to dynamically resize the representations of the POIs or other items in a natural perspective-based layout. For example, POIs that are further away are rendered using smaller representations, which closer POIs are rendered in larger sizes. In some embodiments, the system 100 can further modify the representations of the POIs by adding perspective effects such as arching, rotating about one or more display axes, and the like based on, e.g., a calculated perspective for a selected viewing location.

In another embodiment, the system 100 can group one or more representations of the POIs in the perspective display based on their degree of overlapping. For example, the system 100 can sort the POIs by, for instance, distance from a viewing angle and then select the closest POI as an initial reference point for determining overlapping. Moving from closest to farthest, the system 100 evaluates whether a farther POI representation overlaps a closer POI representation. If the overlap is by more than a predetermined criterion (e.g., overlap by 10% or more), then the farther POI representation is grouped with the closer POI representation. In one embodiment, the group representation (e.g., based on the closest POI, a category of the grouped POIs, etc.) is then rendered at the centroid location of the group in the perspective display.

In another embodiment, once the representations are grouped, the system 100 can provide for expansion of the group based on user interaction. For example, a user can select the group representation in the perspective display to cause a rendering of the expansion of the POI representations in the group. In one embodiment, the rendering of the expansion displays a representation of a centroid of the group (e.g., determined based on location information of the group members) with representations of individual members of the group emanating from the centroid in concentric circles (e.g., depending on the number of group members). Selecting the centroid or issuing a grouping command can then regroup the representations to provide more available display space.

In one embodiment, the system 100 can further declutter a display by determining the overlapping of the representations of the POIs in the perspective display, and then applying one or more de-overlapping algorithms. As noted above, the de-overlapping algorithms can take precedence over the grouping algorithms to maximize the amount of information presented. Examples of such algorithms include, but are not limited to, a "global" de-overlapping and a "slice" de-overlapping. In one embodiment, global de-overlapping comprises determining a degree and direction (e.g., up, down, left, or right) of overlap between any two representations, and then moving one or more overlapping representations in the direction indicate by the overlapping to reduce (e.g., below a criterion such as below 10% overlap) or eliminate the overlap. For example, the system 100 can apply the global de-overlapping algorithm from closest to farthest POI until all POIs are de-overlapped.

In another embodiment, the slice de-overlapping algorithm comprises designating or "slicing" the perspective into regions and then evaluating the density of POI representations within each region. In some embodiments, the system 100 starts by evaluating overlapping of representations in the densest region first. The evaluation includes, for instance, determining representations that cross or straddle the boundaries between the regions. The system 100 then moves the location of the straddling representation to either of the regions adjacent to the boundary based on, for instance, a degree or percent of the straddling. In other embodiments, the system 100 can move the representation to the less dense region. Once a particular is region is processed, the system 100 "freezes" the region (e.g., locks the locations of the representations in that region) and moves to the next region. The system 100 then applies the same boundary analysis but will move representations only to regions that have not been previously frozen.

In one embodiment, the system 100 can further declutter the perspective display by determining whether certain POIs might be occluded by other features (e.g., buildings, terrain features, etc.) in the perspective display. Those representations that are occluded would then not be rendered in the perspective display. For example, the system 100 can leverage three-dimensional models of an environment depicted in the perspective display and then process the locations of the POIs against the models to determine potential occlusions.

In yet another embodiment, the number of cells in the array representing the perspective display, the size of the cells or block of cells, the length or extent of the search for non-overlapping cells, the grouping of the representations, the de-overlapping of the representations, and the like enable programmatic control over the resource burden associated with the processing of generating and/or rendering the perspective display. Following the defining of the surface (e.g., the cylinder) and the mapping of the representations of the POIs onto the surface, the system 100 can use, for instance, orientation information associated with a device (e.g., a compass heading) to select a portion of the surface to render in the perspective display of a location-based user interface based on a viewing location and perspective. For example, direction information is combined with information on the angle of view of the camera to select a portion of the surface to display.

If the compass heading or information changes but the location (e.g., latitude and longitude) of the device remains the same, the system 100 can just select a new portion of the surface to display that corresponds to the new orientation information. For example, in an augmented reality display, the system 100 displays a live camera view of the surrounding location and supplements with the live image with information (e.g., pictures, media, text labels, descriptions, etc.) relevant to each POI in a real time manner. The viewpoint for providing the augmented reality display is dependent on, for instance, where the user's device is pointed as determined by the device's location, directional heading, and tilt angle. Accordingly, as the user moves the device, the view in the augmented reality display and the displayed POIs change dynamically based on the movement. In one embodiment, a new set of POIs is downloaded only after the device moves far enough that it is no longer near or substantially near the original viewing location.

As noted previously, the mapping display of the system 100 is not limited to augmented reality displays and may include other types of mapping displays such an augmented virtuality display (e.g., using 3D models to represent real world locations and POI information), conventional 3D maps, and/or any other display of perspective-based mapping, location, or navigation information. As used herein, in certain embodiments, mapping, location, and navigation information (collectively referred to herein as mapping information) refers to information about the user's location (e.g., map coordinates), other locations (e.g., destinations, POIs), relationships between locations (e.g., directions for travelling between the locations, relative positions of the locations, associations between the locations), and the like.

As shown in FIG. 1, a user equipment (UE) 101 may retrieve mapping information (e.g., POI information, 3D maps) from a map platform 103 via a communication network 105. The mapping information may be utilized by applications 107 on the UE 101 (e.g., an augmented reality application 107, a navigation application 107). The applications 107 may also include a display manager 109 to generate perspective displays as discussed with respect to various embodiments described herein for use or presentation by the applications 107. Moreover, the POI or other item information to be included in the perspective display may be included in a map database 111 associated with the map platform 103 for access by the applications 107. In certain embodiments, POI and other related information is information that may be utilized by the augmented reality application 107 for display to the user. As discussed previously, POI information may also include or be associated with maps, satellite images, street and path information, signing information associated with maps, objects and structures associated with the maps, information about people and the locations of people, places of interest, associated metadata, coordinate information associated with the information, three-dimensional models of the environment, etc., or a combination thereof. A POI can be a specific point location that a person may, for instance, find interesting or useful. Examples of places or points-of-interest can include an airport, a bakery, a dam, a landmark, a restaurant, a hotel, the location of a person, or any point interesting, useful, or significant in some way.

In certain embodiments, POI information may be associated with content information including live media (e.g., streaming broadcasts), stored media (e.g., stored on a network or locally), metadata associated with media, text information, location information of other user devices, or a combination thereof. The content may be provided by the service platform 113 which includes one or more services 115a-115n (e.g., music service, mapping service, video service, social networking service, content broadcasting service, etc.), the one or more content providers 116a-116m (e.g., online content retailers, public databases, etc.), other content source available or accessible over the communication network 105.

For example, the applications 107 may display location-related content information (e.g., content associated with a POI or with a particular location) in the perspective display in addition or as an alternate to the POI information. If there are high densities of such content information in the mapping display, the display manager 109 may be used to select and render the content information as well.

In one embodiment, an image capture module 117 of the UE 101 may be utilized in conjunction with the augmented reality application 107 to present location information (e.g., mapping and POI information) to the user. For example, the user may be presented with an augmented reality interface associated with the augmented reality application 107 or the navigation application 107 that presents mapping information (e.g., POI information), content information, and the like on a mapping display. In certain embodiments, the user interface may display a hybrid physical and virtual environment where 3D objects from the map database 111 are placed superimposed on top of a live (e.g., via a camera of the UE 101) or pre-recorded image (e.g., a 360° panoramic picture) of a corresponding location. In another embodiment, the mapping information and the maps presented to the user may be a simulated 3D environment in place of or in addition to the live augmented reality display. Accordingly, the display manager 109 can operate on the augmented reality mapping display, the simulated 3D display, and/or other perspective displays to select items and related information (e.g., POI information, location-related content information) presented therein.

As noted, the UE 101 may execute one or more of the applications 107 to view or access POI information. As mentioned above, the mapping information may include POI information, location information, directions or associations to a location, or a combination thereof. In one example, a default setting may allow the user to view information about POIs associated with locations, structures, and other objects associated with an augmented reality display or 3D environment. For example, the user may point the UE 101 towards a location or feature in the mapping display to view corresponding POI information. More specifically, the application 107 (e.g., the augmented reality application 107) may associate the location or feature with geographic coordinates based on the determined viewpoint. Then, the application 107 may retrieve POI information corresponding to the location from the map platform 103 for presentation in the mapping display. As discussed, if the POI information includes multiple POIs that are closely located, the mapping display can become cluttered, making it difficult to discern and identify the closed located POIs. In this case, the display manager 109 operates on the perspective display to reduce clutter by selecting and organizing POI or item information for display.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, map platform 103, and service platform 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the augmented reality or navigation application 107 and the map platform 103 may interact according to a client-server model. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
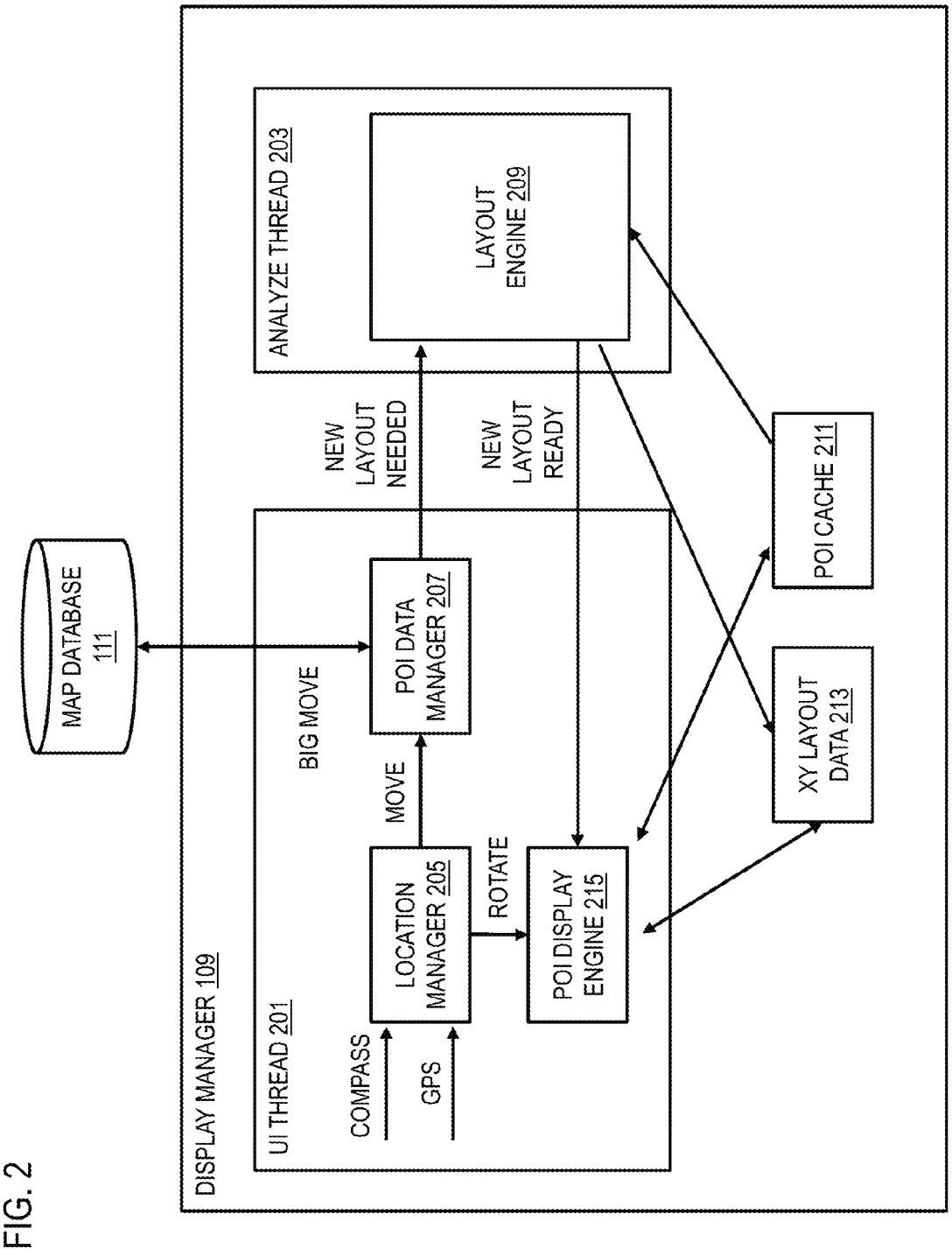
FIG. 2 is a diagram of the components of a display manager, according to one embodiment.

FIG. 2 is a diagram of the components of a display manager, according to one embodiment. By way of example, the display manager 109 includes one or more components for grouping and/or de-overlapping items in a perspective display. It is contemplated that the functions of these components may be combined in one or more components or performed by other components of equivalent functionality. As shown, the display manager 109 includes a user interface (UI) thread 201 and an analyze thread 203 that interact to select one or more items (e.g., POIs) for generating a perspective display. By way of example, the UI thread 201 supports a location manager 205 for determining and processing location information associated with, for instance, a UE 101. In one embodiment, the location manager 205 interacts with location sensors of the UE 101 to receive orientation information (e.g., compass information) and location information (e.g., GPS information).

In addition, the location manager 205 can interact with a POI data manager 207 to determine what items (e.g., POIs) to display. More specifically, the POI data manager 207 fetches (e.g., via wireless or over-the-air connection) POI information from one or more remote services such as the map database 111 of the map platform 103 based on location information (e.g., GPS information) provided by the location manager 205. In one embodiment, because the GPS location changes as the device moves, the display manager 109 fetches POI data only when the move is sufficiently farther from the previous location when the previous set of POIs were fetched. By way of example, such a move (e.g., a move beyond a predetermined distance threshold) is dubbed as "Big Move" in FIG. 2.

In one embodiment, a predetermined number (the number is configurable) of POIs are fetched on a "Big Move" and cached (e.g., in the POI cache 211). More specifically, the POI data manager 207 determines that there is a "Big Move" and that a new layout of the perspective display is needed to accurately generate the view from the new viewing location. This determination causes the POI data manager 207 to direct a layout engine 209 to initiate generation of a new or updated perspective display. This process includes, for example, retrieving the POI information from the POI cache 211 and then determining the geographical locations of nearby POIs and/or items with respect to the new location. In one embodiment, the locations or nearby POIs are calculated and stored in a XY layout data module 213. The layout engine 209 then notifies a POI display engine 215 that the new layout is ready for rendering to the user.

In contrast, when a device moves a smaller distance (e.g., less than 50 m), dubbed as "Small Move", or when the change in location information is a change in orientation information (e.g., rotating, tilting, panning, the device), then no new POIs are fetched. Instead the existing POIs are re-positioned and the perspective display is regenerated by the POI display engine 215. In one embodiment, the POI display engine 215 presents an augmented reality display by directing the image capture module 117 of the UE 101 to provide to a user a live camera view of a current location of the UE 101. The image capture module 117 may include a camera, a video camera, and/or other imaging device. In one embodiment, visual media is captured in the form of an image or a series of images. These images are then presented in the mapping display by the POI display engine 215.

In addition or alternatively to generate the augmented reality display, the POI display engine 215 may provide a mapping display using non-reality based representations (e.g., a 3D simulated environment or other rendered maps) of a particular location as described above. For example, the rendering module 203 may obtain mapping data (e.g., 3D models, map tiles, map images, terrain features, etc.) from the map database 111 or the map platform 103 to render the mapping display.

Thus employing techniques such as smart fetching, caching POIs, grouping, de-overlapping, and/or proprietary display algorithms, the system 100 provides the user with a seamless and fluid experience in viewing POIs while reducing potential clutter and information overload.

Figure 3:
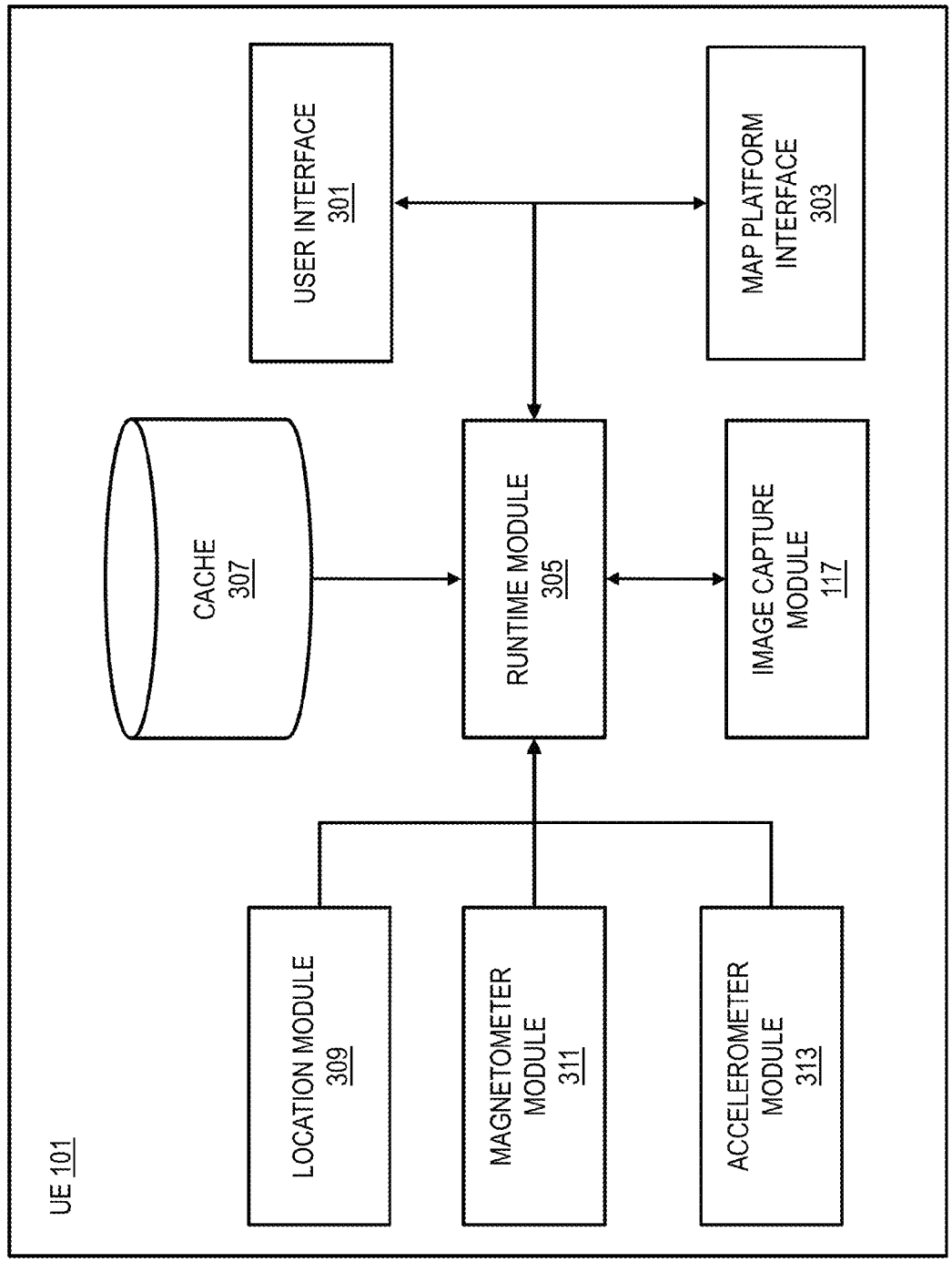
FIG. 3 is a diagram of the components of a user equipment capable of grouping and de-overlapping items in a perspective display, according to one embodiment.

FIG. 3 is a diagram of the components of a user equipment capable of generating a perspective display, according to one embodiment. By way of example, the UE 101 includes one or more components for grouping and/or de-overlapping items in a perspective display as discussed in various embodiments of the approach described herein. It is contemplated that the functions of these components may be combined in one or more components or performed by other components of equivalent functionality. In this embodiment, the UE 101 includes: (1) a user interface 301 to present a perspective display including, for instance, POI information; (2) a map platform interface 303 to retrieve POI information from the map platform 103, the service platform 113, and or the data providers 116; (3) a runtime module 305 for executing one or more applications (e.g., augmented reality application 107, navigation application 107) that includes or has access to a display manager 109; (4) a cache 307 to locally store POI information and/or related content information; (5) a location module 309 to determine a location of the UE 101; (6) a magnetometer module 311 to determine horizontal orientation or directional heading (e.g., a compass heading) of the UE 101; and (7) an accelerometer module 313 to determine vertical orientation or an angle of elevation of the UE 101; and (8) an image capture module 117.

The perspective display may be presented to the user via the user interface 301, which may include various methods of communication. For example, the user interface 301 can have outputs including a visual component (e.g., a screen), an audio component (e.g., a verbal instructions), a physical component (e.g., haptic feedback), and other methods of communication. User inputs can include a touch-screen interface, microphone, camera, a scroll-and-click interface, a button interface, etc. Further, the user may input a request to start an application 107 (e.g., an augmented reality or navigation application) and utilize the user interface 301 to receive a perspective display including POI and/or other mapping information. Through the user interface 301, the user may request different types of content, mapping, or location information to be presented. Further, the user may be presented with 3D or augmented reality representations of particular locations and related objects (e.g., buildings, terrain features, POIs, etc. at the particular location) as part of a graphical user interface on a screen of the UE 101.

The map platform interface 303 is used by the runtime module 305 to communicate with the map platform 103. In some embodiments, the interface is used to fetch POI information and/or related content, mapping, and or location information from the map platform 103, service platform 113, and/or content providers 115a-115m. The UE 101 may utilize requests in a client server format to retrieve the POI and/or mapping information. Moreover, the UE 101 may specify location information and/or orientation information in the request to retrieve the POI and/or mapping information. The location module 309, magnetometer module 311, accelerometer module 313, and image capture module 117 may be utilized to determine location and/or orientation information used in determining along which the direction the UE 101 is pointed (e.g., the viewpoint of the UE 101) so that POI and related information corresponding to the pointed direction can be retrieved. Further, this POI and mapping information may be stored in the cache 307 to be utilized in generating a perspective display at the UE 101.

In one embodiment, the location module 309 can determine a user's location. The user's location can be determined by a triangulation system such as a GPS, assisted GPS (A-GPS) A-GPS, Cell of Origin, wireless local area network triangulation, or other location extrapolation technologies. Standard GPS and A-GPS systems can use satellites 119 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 309 may also utilize multiple technologies to detect the location of the UE 101. GPS coordinates can provide finer detail as to the location of the UE 101. As previously noted, the location module 309 may be utilized to determine location coordinates for use by the application 107 and/or the map platform 103.

The magnetometer module 311 can include an instrument that can measure the strength and/or direction of a magnetic field. Using the same approach as a compass, the magnetometer is capable of determining the directional heading of a UE 101 using the magnetic field of the Earth. The front of the image capture device (e.g., a digital camera) (or another reference point on the UE 101) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer is utilized to determine the orientation of the user. This directional information may be correlated with the location information of the UE 101 to determine where (e.g., at which geographic feature, object, or POI) the UE 101 is pointing towards. This information may be utilized to select a first person view to render the perspective display.

Further, the accelerometer module 313 may include an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 313 can determine the angle the UE 101 is pointed as compared to Earth's gravity. In one embodiment, vertical directional data obtained from an accelerometer is used to determine the angle of elevation or tilt angle at which the UE 101 is pointing. This information in conjunction with the magnetometer information and location information may be utilized to determine a viewpoint to provide POI and mapping information to the user. As such, this information may be utilized in selecting available POI and/or other items to present information to the user. Moreover, the combined information may be utilized to determine portions of a particular 3D map or augmented reality view that may interest the user. In one embodiment, if the location information associated with one or more available POI items does not correspond to the viewpoint (e.g., is not visible in the selected viewpoint), one or more indicators (e.g., arrows or pointers) may be shown on the user interface to indicate the direction towards the location of the POI items.

In another embodiment, the user may manually input any one or more of the location, directional heading, and tilt angle to specify a viewpoint for displaying the user interface on the UE 101 instead of determining the viewpoint from the sensors. In this way, the user may select a "virtual viewpoint" to be a place other than the current location and pointing direction of the UE 101.

Images for supporting a graphical user interface can be captured using the image capture module 117. The image capture module 117 may include a camera, a video camera, a combination thereof, etc. In one embodiment, visual media is captured in the form of an image or a series of images. The image capture module 117 can obtain the image from a camera and associate the image with location information, magnetometer information, accelerometer information, or a combination thereof. As previously noted, this combination of information may be utilized to determine the viewpoint of the user by combining the location of the user, horizontal orientation information of the user, and vertical orientation information of the user. This information may be utilized to retrieve POI and mapping information from the map cache 307 or the map platform 103. In certain embodiments, the cache 307 includes all or a portion the information in the map database 111.

Figure 4:
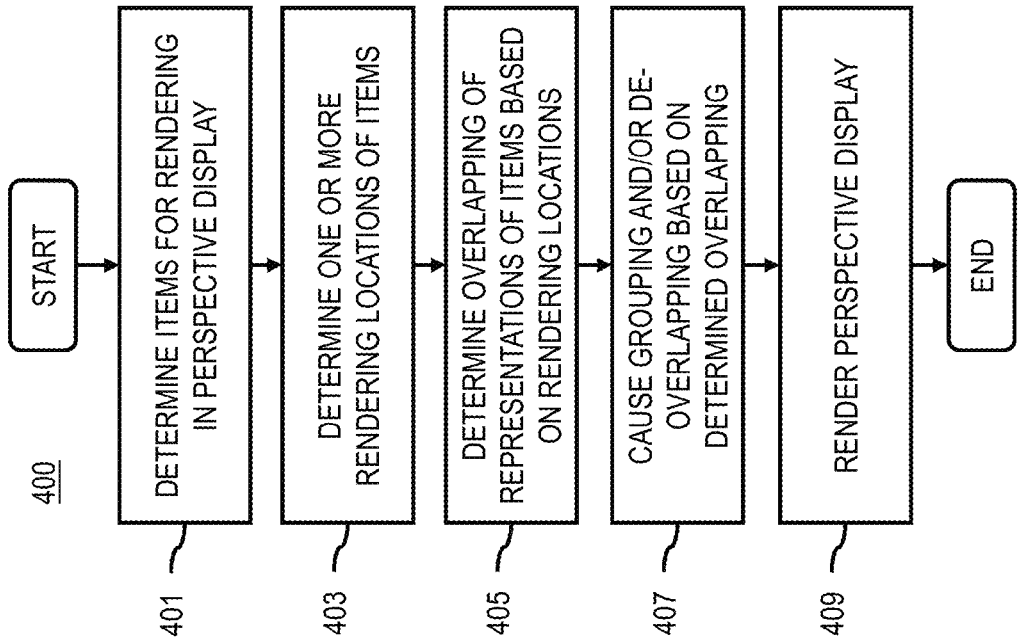
FIG. 4 is a flowchart of a process for grouping and de-overlapping items in a user interface, according to one embodiment.

FIG. 4 is a flowchart of a process for grouping and de-overlapping items in a user interface, according to one embodiment. In one embodiment, the display manager 109 performs the process 400 and is implemented in, for instance, a chip set including a processor and a memory as shown FIG. 23. The process 400 provides a general overall process for grouping and/or de-overlapping items in a perspective display that is discussed in more detail with respect to FIGS. 5-13 below. In certain embodiments, the map platform 103 may alternatively perform some or all of the steps of the process 400 and communicate with the UE 101 using a client server interface. The UE 101 may activate an augmented reality application 107 to generate a perspective display for presentation of POI information. In one embodiment, the augmented reality application 107 may execute upon the runtime module 305.

In addition, in one embodiment, the process 400 enhances the general process of generating a perspective display as described with respect to FIG. 14 below. For example, according to the process 1400 of FIG. 14, the display manager 109 transforms the relative locations of POIs from the latitude and longitude to polar coordinates relative to the UE 101 (e.g., a mobile device). Representations of the POIs are then projected onto, for instance, a virtual cylinder or sphere around the device using an approximation of artistic perspective. Next, the cylinder is divided into a grid. The representations of the POIs are expanded to cover a block of grid cells and moved to avoid as much overlap as possible. In one embodiment, the process 1400 of FIG. 14 uses a flexible, but limited, search pattern to locate non-overlapping blocks. The process 400 of FIG. 4 enhances the limited search pattern by providing for efficient grouping and de-overlapping of POIs.

In step 401, the display manager 109 determines one or more items for rendering in a location-based user interface that includes, at least in part, a perspective display. By way of example, the items designated for rendering depends on the viewing perspective, field of view, preferences, etc. associated with POIs or items available for display in the perspective display. Next, the display manager 109 causes, at least in part, a determination of one or more rendering locations for one or more representations of the one or more items based, at least in part, on location information associated with the one or more items (step 403). In one embodiment, the rendering locations are determined according to cell-based process described with respect to the process 1400 of FIG. 14. In some embodiments, the rendering locations can also be mapped to pixel locations of the UE 101 (e.g., with a 640×480 pixel 4:3 display, a 854×480 pixel 16:9 display, etc.).

In step 405, the display manager 109 determines whether any of the representations overlap based, at least in part, on their rendering locations. For example, the display manager 109 can determine respective starting and ending points (e.g., or pixels) of each representation, and then apply one or more equations to determine whether the respective starting and/or ending points overlap (see description below for further details of overlap detection).

In step 407, the display manager 109 then causes, at least in part, a grouping, a de-overlapping, or a combination thereof of the one or more representations based, at least in part, on the overlapping of the one or more rendering locations. In one embodiment, the display manager 109 will attempt to separate or de-overlap close POI representations so that they do not overlap before determining whether to group the representations. In other words, the display manager 109 will group POI representations only if they cannot first be de-overlapped by, for instance, moving them to non-overlapping positions.

Next in step 409, the display manager 109 causes, at least in part, a rendering of the one or more representations in the perspective display based, at least in part, on the grouping, the de-overlapping, or a combination thereof.

Figure 5:
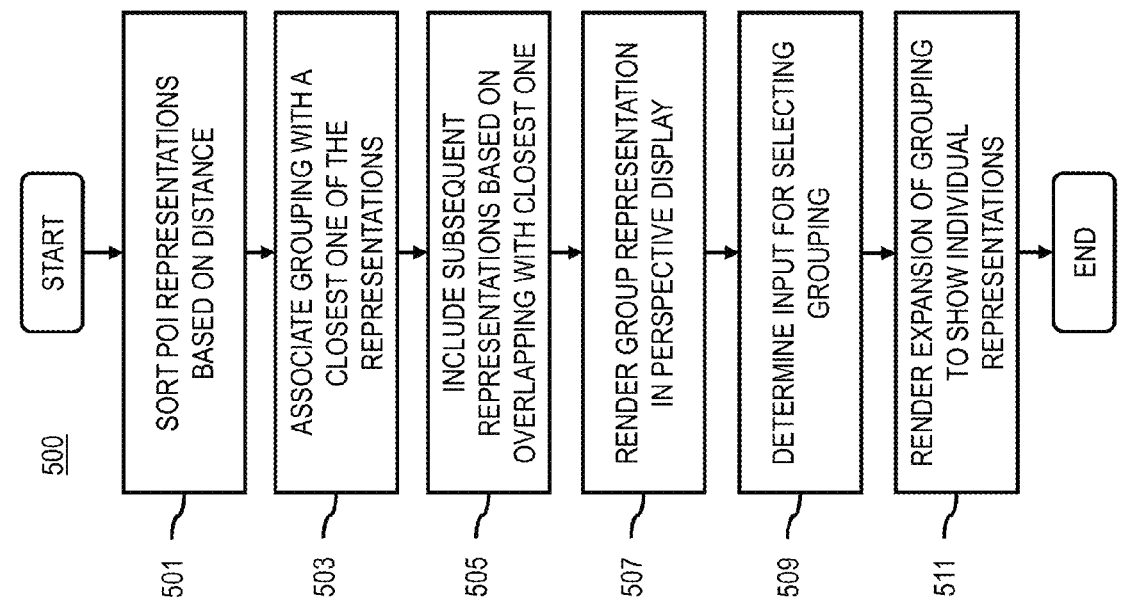
FIG. 5 is a flowchart of a process for grouping items based on distance and overlapping, according to one embodiment.

FIG. 5 is a flowchart of a process for grouping items based on distance and overlapping, according to one embodiment. In one embodiment, the display manager 109 performs the process 500 and is implemented in, for instance, a chip set including a processor and a memory as shown FIG. 23. In certain embodiments, the map platform 103 may alternatively perform some or all of the steps of the process 500 and communicate with the UE 101 using a client server interface. In addition, the process 500 is one embodiment for performing the grouping described with respect to the process 400. Accordingly, the process 500 is initiated on, for instance, a determination by the display manager 109 that one or more POI representations are to be grouped.

In step 501, the display manager 109 processes and/or facilitates a processing of the location information associated with the POIs determined for presentation in a perspective display to cause, at least in part, a sorting of the one or more representations. In one embodiment, the sorting is based, at least in part, on a distance of the one or more representations from a viewing location associated with the perspective display. In some embodiments, the distance may be determined based on the actual location of the POIs or from the rendering locations determined for the representations corresponding to the POIs or items.

Next, the display manager 109 causes, at least in part, an association of the grouping with a closest one of the one or more representations based, at least in part, on the sorting (step 503). In other words, the display manager 109 selects the closest POI representation as the reference point from which to determine whether subsequently farther representations overlap. Accordingly, the display manager 109 processes each subsequently farther representation and determines to the include the subsequent ones of the one or more representations in the grouping based, at least in part, on an overlapping with the closest one in the grouping (step 505). By way of example Table 1 below is an example of pseudo code representing the grouping the process 500.

TABLE 1

| Pseudo code: Grouping algorithm |
| --- |
| /* POIs already sorted by distance */<br>Process POIs from closest to farthest<br>   let POI1 be the next POI<br>   for each POI2 after POI1 such that the bottom of POI2 is below the<br>   top of POI1<br>      if POI2 overlaps POI1<br>         if POI1 has not yet been converted to a group, convert it<br>         make POI2 invisible and add it to POI1's group |

The display manager 109 then causes, at least in part, a rendering of a group representation in the perspective display to represent the grouping without rendering the one or more representations associated with individual group members (step 507). For example, the group rendering is used to represent the all of the items in the group. In one embodiment, the location of the group rendering is at a determined centroid location of the individual group items or POIs.

Once the group is rendered, the display manager 109 can determine an input for selecting the group representation in the perspective display, the location-based user interface, or a combination thereof (step 509). For example, a user can indicate the selection by touching or moving a cursor in the user interface to the group representation. Based on the selection, the display manager 109 causes, at least in part, a rendering of an expansion of the grouping to present the one or more representations associated with the individual group members (step 511).

Figure 6B:
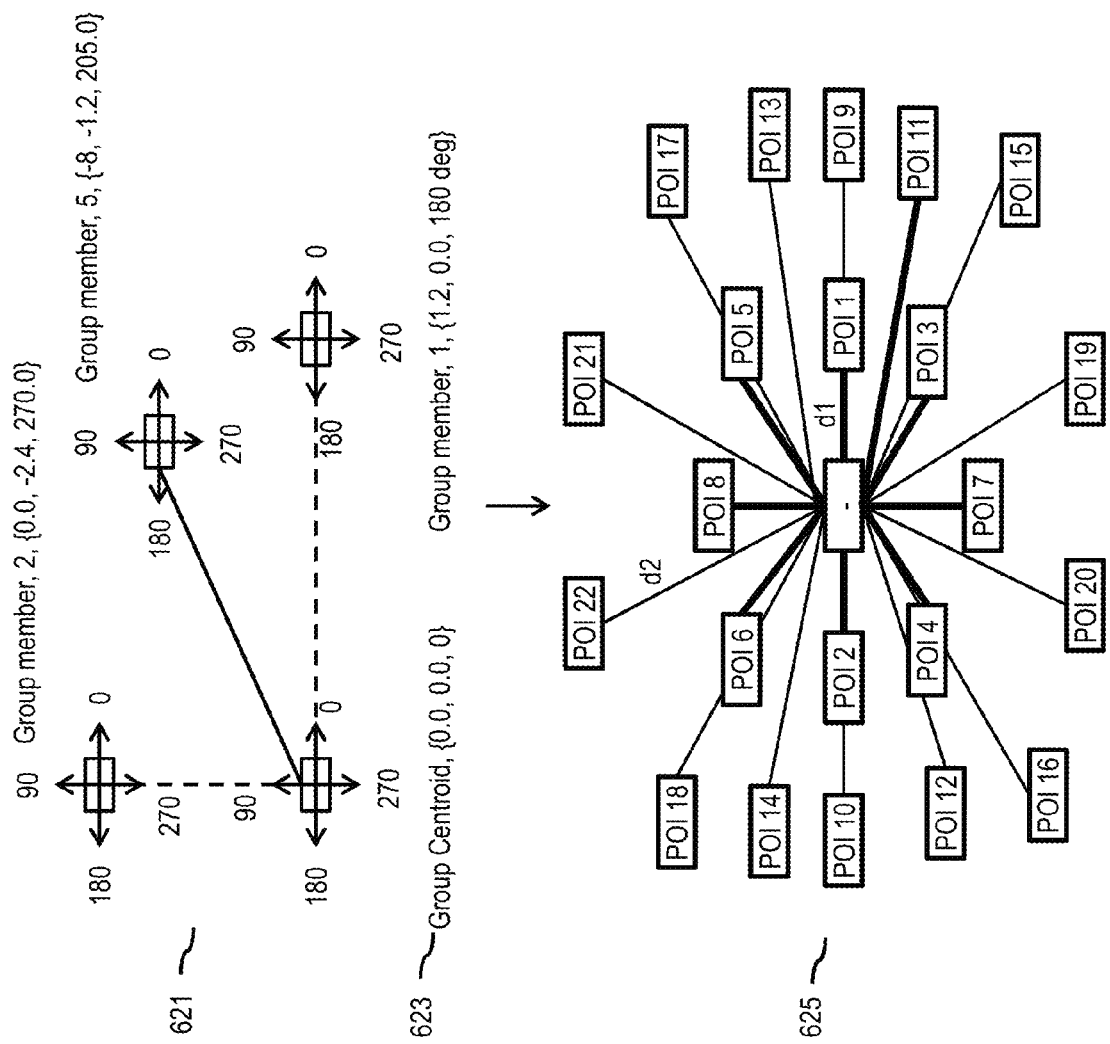

FIGS. 6A and 6B are a flowchart and diagrams of a grouping process, according to various embodiments. In step 601, the display manager 109 determines the rendering locations to construct a layout for the places of interest or POIs to rendering in a perspective display. In one embodiment, the layout is based on a grid or array of cells denoted by rows and columns. The grid, for instance, serves as a reference guide and the representations of the POIs or places or interests need not be perfectly aligned to the grid as shown in user interface (UI) 1*a*.

In step 603, the display manager 109 determines overlapping of the one or more POI representations in the UI 1*a*. For example, as shown POIs 1-8 of the UI 616 are determined to be overlapping. As a result, the display manager 109 detects the POIs 1-8 and collapses them into a group as shown in UI 617 (step 605). In this example, the group representation is rendered as a graphic of a stack of POIs. The stack of POIs is then augmented with a "+" control to indicate that the grouping can be expanded to show additional POI representations.

As noted previously, the group representation can be rendered at a location corresponding to a centroid location of the POIs 1-8.

In step 607, a user touches the screen to select the grouping in UI 618. In response, the display manager 109 expands the group central (step 609) and the group members (step 611) to show the individual POI representations of POIs 1-8 that comprise the grouping (e.g., Gn) as shown in UI 619. The expansion of the group is described in more detail with respect to FIG. 6B below. In one embodiment, on expansion of the group the display manager 109 can disable other POI representations (e.g., POIs 9-11) that are visible in the perspective display (step 613). By way of example, disabling may entail, for instance, making the POI representations not visible (e.g., as shown) or otherwise deemphasizing the POI representations (e.g., fading the rendering of the POI representations, moving them to a temporary location in the UI, etc.).

In step 615, the user clicks on the centroid of the expanded grouping (e.g., designated with a "-" sign to indicate that the group can is an expanded state and can be collapsed. The display manager 109 then re-renders the perspective display to show the group representation and enables the POI representations (e.g., POIs 9-12) that had been disabled to show all of the POI representations previously displayed before the expansion as shown in UI 620.

FIG. 6B is a diagram of a process for calculating the rendering locations of individual group members on expansion of a grouping of POI representations, according to one embodiment. As shown in UI 621, when a user selects to expand a POI grouping as described above, the display manager 109 expands the group in to a group centroid 623 and the individual group members (e.g., POIs 1-22). In one embodiment, the group members expand into concentric circles based on the number of group members, the available display area, and the like. For example, on a typical mobile device, the display manager 109 may provide for at least two concentric circles (e.g., circle 1 with a max of 8 POI representations, and circle 2 with a max of 14 POI representations).

In one embodiment, the display manager 109 computes group variables to describe the position of the respective POI representation in terms of line and angular drawing: e.g., x, y, distance (d) and angle (phase). In some embodiments, the distance d1 (e.g., corresponding to distance in the x direction) and d2 (e.g., corresponding to distance in the y direction), where distance (d) (e.g., corresponding to a distance between the group centroid 623 and the group members POI 1 and POI 2 respectively) can be normalized to reflect actual distance in the real world. In addition, the example of FIG. 6B is shown using a pixel-coordinate system and angular direction to draw a line from the center of the group member to the group centroid 623. By way of example, the distance among the group members and/or the group centroid 623 can be deduced using the x, y coordinates using, for instance, the Pythagorean Theorem to determine the plane geometry while drawing the line intersection. In one embodiment, the line intersection can be precomputed using a table of angles to reduce resources and improve performance. The calculated distances and phases can be used to render the expanded POI representations as shown in UI 625.

Figure 7:
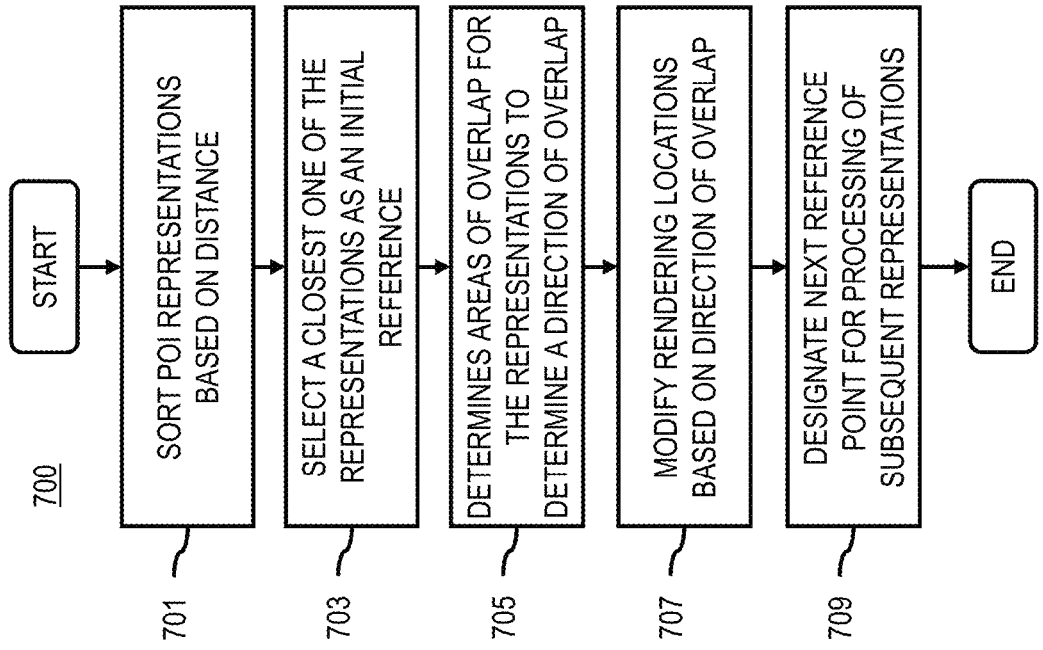
FIG. 7 is flowchart of a process for de-overlapping items in a user interface using a "global" approach, according to one embodiment.

FIG. 7 is flowchart of a process for de-overlapping items in a perspective display using a "global" approach, according to one embodiment. In one embodiment, the display manager 109 performs the process 700 and is implemented in, for instance, a chip set including a processor and a memory as shown FIG. 23. In certain embodiments, the map platform 103 may alternatively perform some or all of the steps of the process 700 and communicate with the UE 101 using a client server interface. In addition, the process 700 is one embodiment for performing the de-overlapping described with respect to the process 400. Accordingly, the process 700 is initiated on, for instance, a determination by the display manager 109 that one or more POI representations are to be de-overlapped.

In step 701, the display manager 109 processes and/or facilitates a processing of the location information associated with the POIs determined for presentation in a perspective display to cause, at least in part, a sorting of the one or more representations. By way of example, the sorting is performed as described with respect to the process 500 of FIG. 5. The display manager then begins processing the POI representations from closest to farthest. In step 703, the display manager 109 determines to a closest one of the one or more representations as an initial reference for a de-overlapping determination.

The display manager 109 then processes and/or facilitates a processing of respective areas of a subsequent one of the one or more representations (e.g., a next farthest one of the representation) and the initial reference to determine a direction of overlap (step 705). In one embodiment, the determination is based on calculating the direction of least overlap among, for instance, up, down, left, and right. The process for performing this calculation is explained in more detail with respect to FIG. 9 below.

Based on the determined direction of least overlap, the display manager 109 causes, at least in part, a modification of the one or more rendering locations associated with the subsequent one based, at least in part, on the direction of overlap (step 707). For example, if the direction of least overlap is to the right, the display manager can move the rendering location of the overlapping representation to the right to reduce (e.g., below a predetermined threshold such as 10% overlap) or eliminate the overlapping.

Next, the display manager 109 causes, at least in part, a designation of the subsequent one (e.g., the representation just processed against the initial reference) as the next reference for processing the next farthest representation to determine its direction of overlap (step 709). This process is repeated until the designated POI representations in the perspective display have been processed. In one embodiment, the designated POI representations may include those representations that are at least partially visible within the field of view depicted in the perspective display.

Table 2 below provides example pseudo code summarizing the global de-overlapping approach.

TABLE 2

Pseudo code: De-Overlapping algorithm (global method)

sort POIs by distance
Process POIs from closest to farthest
    let POI1 be the next POI
        for each POI2 after POI1 such that the bottom of POI2 is below the top of POI1
            determine the preferred movement for POI2 to eliminate overlap:
                none, if POI1 and POI2 don't overlap
                up, if the least overlap is at the top of POI1
                right, if the least overlap is along the right side of POI1
                left, if the least overlap is along the left side of POI1
            Compute the desired location of POI2 to eliminate overlap
            if direction is left or right
                for each POI3 before POI1 such that the top of POI3 is above the bottom of POI2
                    /* POI3 is frozen */
                    if POI3 overlaps the new location for POI2
                        change the movement of POI2 to up and compute TABLE 2-continued Pseudo code: De-Overlapping algorithm (global method)

the new location
    exit loop for POI3
  move POI2 to the new location

Figure 8A:
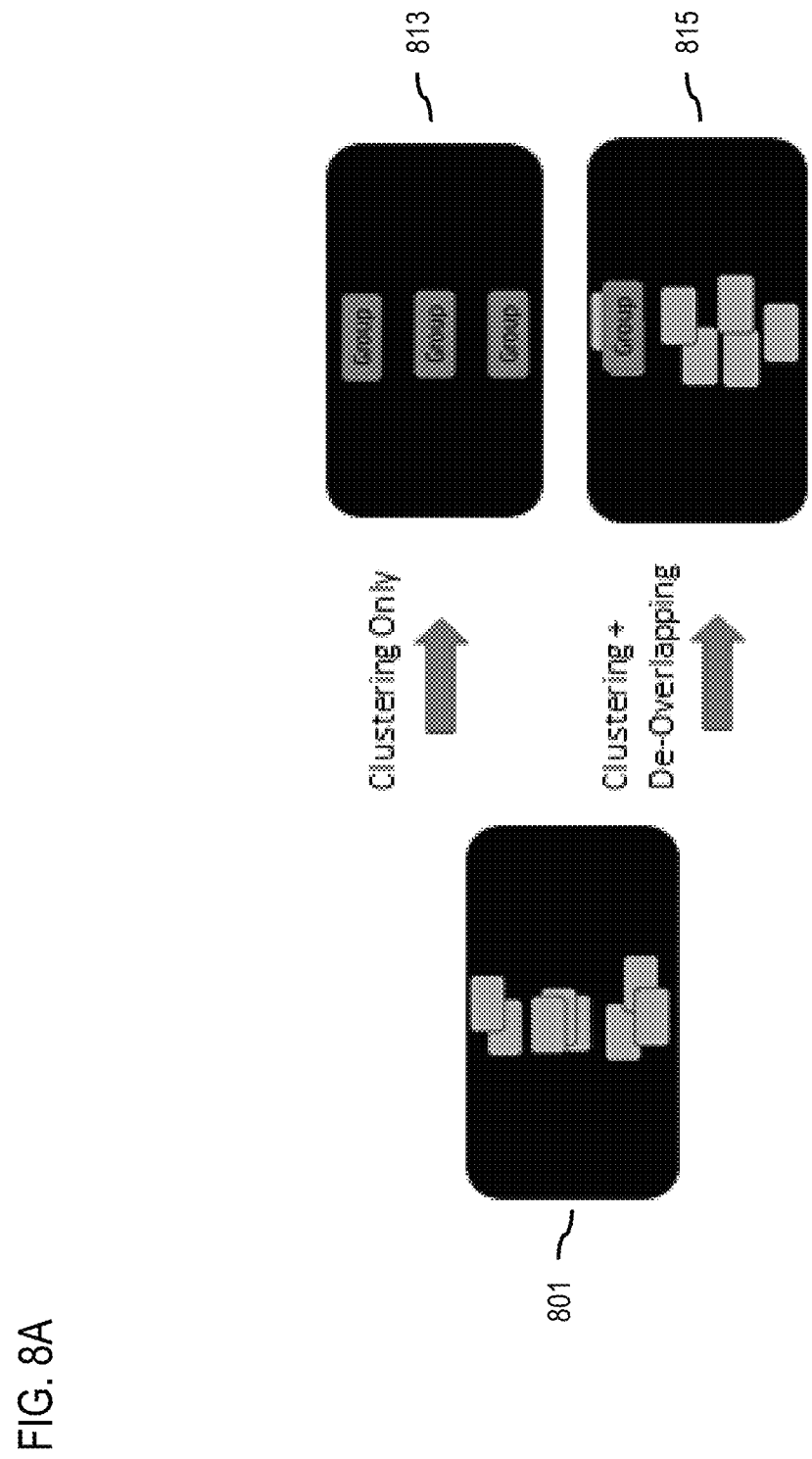
FIGS. 8A and 8B are diagrams depicting a global de-overlapping approach, according to various embodiments.
Figure 8B:
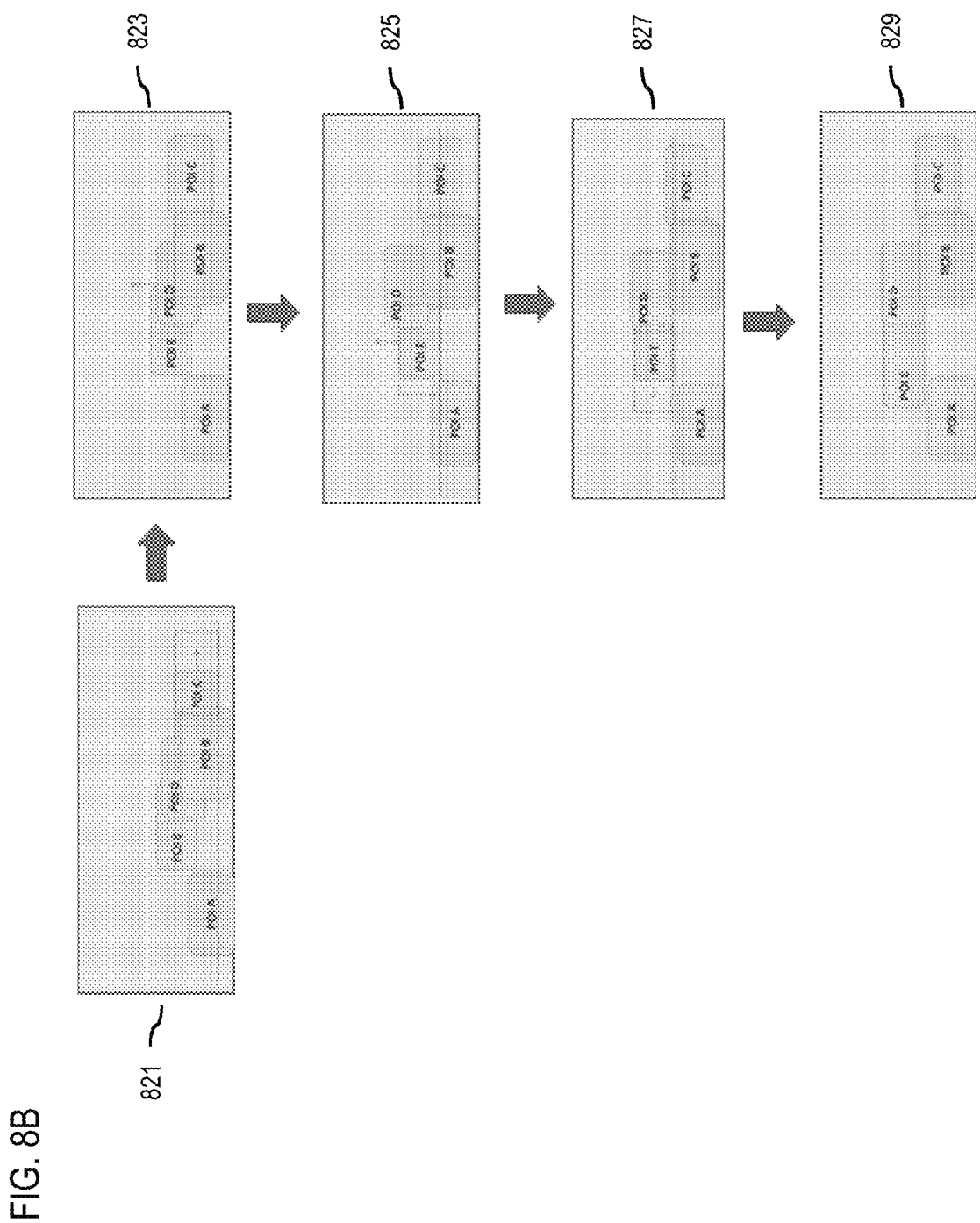

FIGS. 8A and 8B are diagrams depicting a global de-overlapping approach, according to various embodiments. FIG. 8A illustrates the difference in performing grouping or clustering versus performing grouping in combination with de-overlapping. As noted previously, one goal of the system 100 is avoid to the extent possible clustering or grouping of POI representations that are close to each other. As shown in FIG. 8A, a UI 801 depicts a perspective display in which multiple overlapping POI representations are rendered. The POI representations roughly overlap at three points. Accordingly, if only clustering or grouping is performed without first attempting de-overlapping, three groups of POIs will result as shown in UI 813.

On the other hand, if de-overlapping is performed by separate the POI representations as much as possible before grouping, more granular information can be presented as shown in UI 815. Compared to UI 813, UI 815 has resulted in only one grouping of POI representations with the remaining POI representations adequately separated to provide meaningful information to the user. Accordingly, with UI 815, the user is able to view more of the POI representations without having to expand the groups.

FIG. 8B illustrates the global overlapping approach described above, according to one embodiment. As shown, UI 821 presents a perspective display with POI representations that have not yet been de-overlapped. In this example, the display manager 109 selects POI B as the closest POI representation against which to process subsequent POI representations. The next closest POI representation is POI C. The display manager 109 determines that the direction of least overlap is to the right and moves the rendering location of POI C to right to reduce the overlap with POI B as shown in UI 823.

Also shown in UI 823, the display manager 109 then selects the POI D as the next farthest POI representation and determines that the region of least overlap with POI B is up, and moves the rendering location of POI D up to reduce the overlap with POI B resulting in UI 825. The next POI representation, POI E, is a more complex situation in which POI E overlaps with both POI B and POI D. The system first analyzes the overlap of POI E with POI B, the closest POI representation, and determines that to reduce its overlap with POI B, the rendering location of POI E should be moved up as shown in UI 827.

In this position, POI E still substantially overlaps with POI D. Accordingly, the display manager 109 determines the direction of least overlap as left and moves the rendering location of POI E to the left to reduce the overlap. In this position, as shown in UI 829, the POIs A-D are now substantially de-overlapped to improved their visibility and accessibility by the user.

Figure 9:
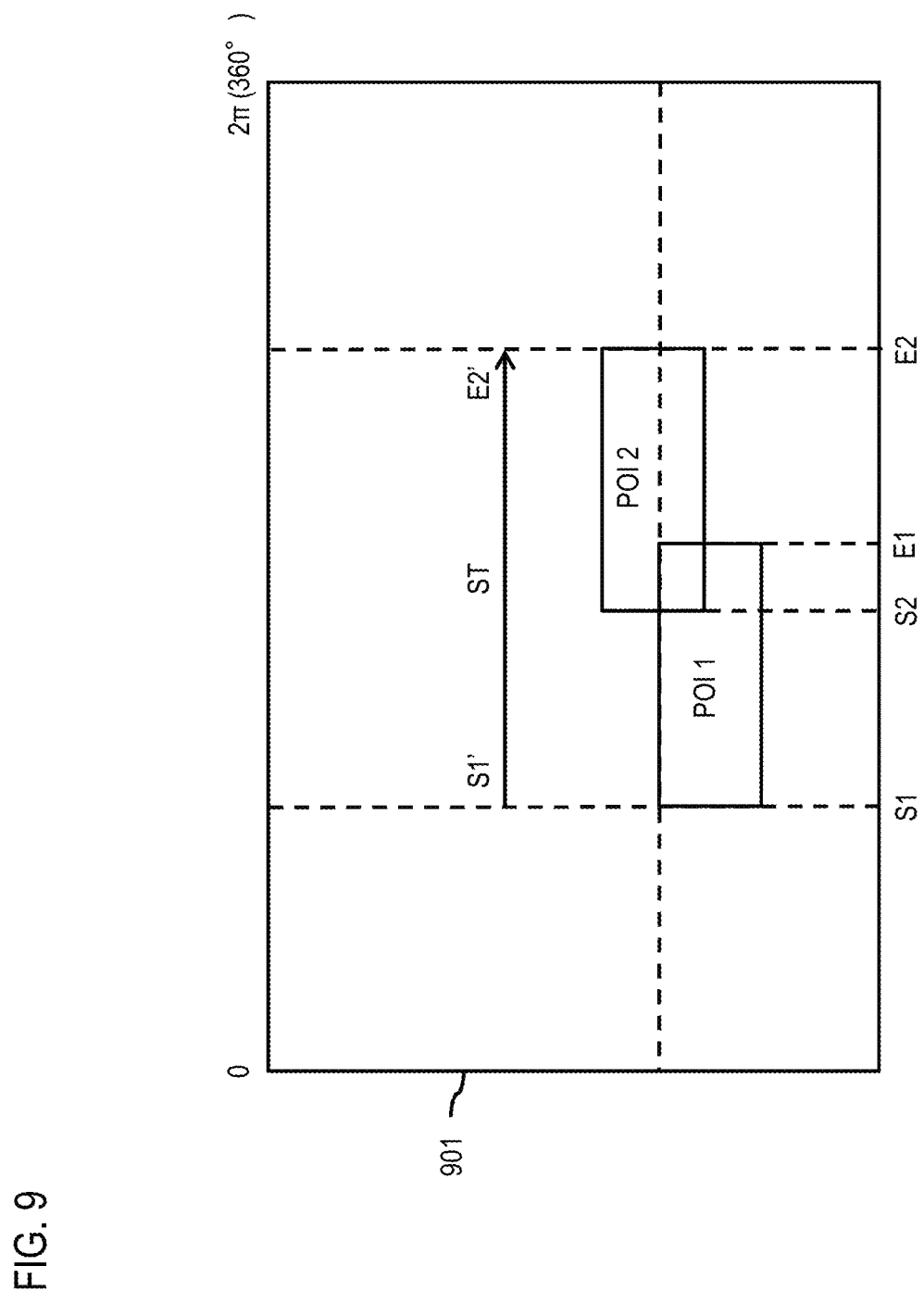
FIG. 9 is a diagram of a process for calculating a degree and direction of overlapping, according to one embodiment.

FIG. 9 is a diagram of a process for calculating a degree and direction of overlapping, according to one embodiment. FIG. 9 depicts a perspective display 901 that spans a field of view covering 0 to $2\pi$ (polar coordinates) or 0-360°. In display 901, there are two POI representations, POI 1 and POI 2, that overlap. The following parameters are defined:

S1→0 to beginning of POI 1;
S2→0 to beginning of POI 2;
E1→to end of POI 1; and
E2→end of POI 2.

Based on these parameters, the display manager 109 can further calculate the following to assist in determining the degree of overlap, the direction of overlap, the extent to which the overlapping POI should be moved, etc. These parameters include, for instance:

S1'=S1−S1=0;
S2'=S2−S1;
E1'=E1−S1;
E2'=E2−S1; and
ST=E2'−S1'.

These calculations can then be used to calculate the horizontal and/or vertical intersects between POI 1 and POI 2. In one embodiment, the horizontal (e.g., left or right) and/or the vertical (e.g., up or down) intersect that is the least (e.g., minimum A) represents the direction of least intersect. The overlapping POI can then be moved based on the extent of the overlap to reduce or avoid overlapping.

Figure 10:
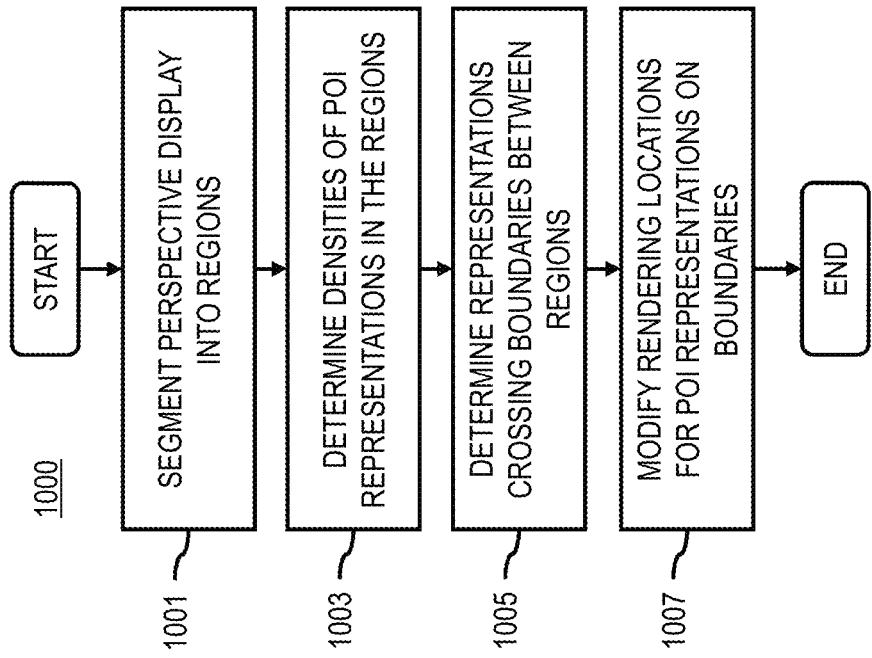
FIG. 10 is a flowchart of a process for de-overlapping items in a user interface using a "slicing" approach, according to one embodiment.

FIG. 10 is a flowchart of a process for de-overlapping items in a perspective display using a "slicing" approach, according to one embodiment. In one embodiment, the display manager 109 performs the process 1000 and is implemented in, for instance, a chip set including a processor and a memory as shown FIG. 23. In certain embodiments, the map platform 103 may alternatively perform some or all of the steps of the process 1000 and communicate with the UE 101 using a client server interface. In addition, the process 1000 is one embodiment for performing the de-overlapping described with respect to the process 400. Accordingly, the process 1000 is initiated on, for instance, a determination by the display manager 109 that one or more POI representations are to be de-overlapped.

In step 1001, the display manager 109 designates or otherwise segments or "slices" the perspective display into one or more regions. In one embodiment, the display segments into vertical and/or horizontal regions. In some embodiments, the display is divided into regions of equal sizes. However, it is also contemplated that the display may be segmented into any bounded region of varying sizes and/or shapes. Once the display is sliced into regions, the display manager 109 processes and/or facilitates a processing of the rendering locations of POIs to determine one or more densities of the one or more representations in one or more regions of the perspective display (step 1003). In other words, the display manager 109 calculates the number of POI representations that are to be rendered in each region.

Next, the display manager 109 determines whether there are any POI representations that cross or straddle the boundaries between the regions (step 1005). In one embodiment, the display manager 109 may make this determination based on a minimum criterion for crossing over. For example, the display manager 109 may set a minimum cross over criterion of at least 10%. In this case, the POI representation my cross from one region to another region by more than 10% to be classified as crossing or straddling the boundary. For POI representations that cross boundaries, the display manager 109 causes, at least in part, a modification of the one or more rendering locations associated with the one or more representations that are at one or more boundaries of the one or more regions (step 1007). As noted, the modification is based, at least in part, on the one or more densities, criteria for percent of the one or more representations crossing the boundaries, or a combination thereof. For example, if a POI representation crosses a boundary between two regions, the POI representation may be moved so it is rendered in a less dense region. In one embodiment, once a region is processed, the display manager 109 locks the region so that no additional POI regions may be moved into the region. The display manager 109 then continues on to process the next region. In one embodiment, the display manager processes the regions from most dense to least dense. It is contemplated that the display manager 109 may process the regions in any order or according to any criteria (e.g., selecting the most dense region and then continue to immediately adjacent regions without regard to their respective densities).

Table 3 below provides example pseudo code for performing the slicing approach to de-overlapping.

TABLE 3

Pseudo code: De-Overlapping algorithm (slice method)

Figure 11B:
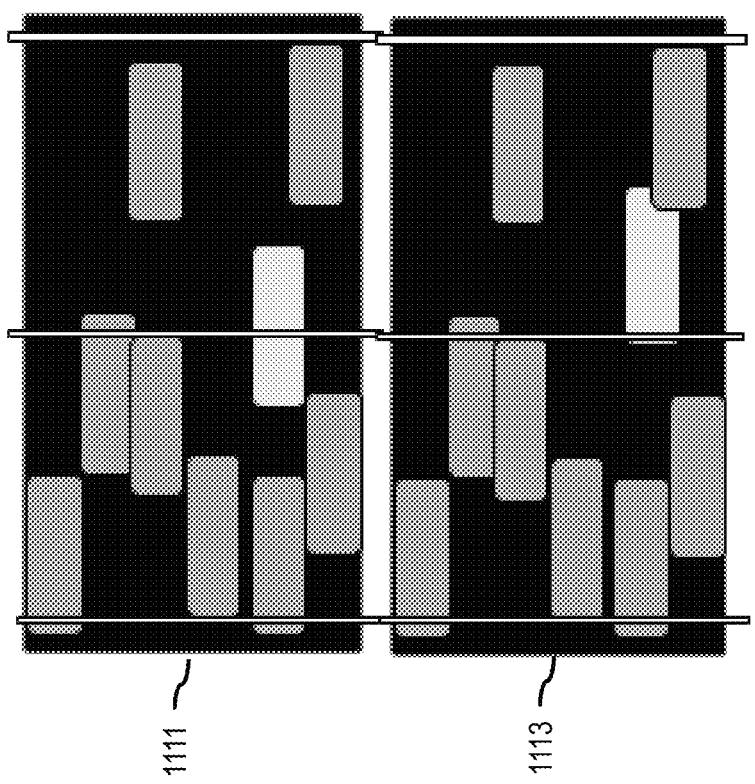
FIGS. 11A and 11B are diagrams depicting a slicing de-overlapping approach, according to various embodiments.
Figure 11A:
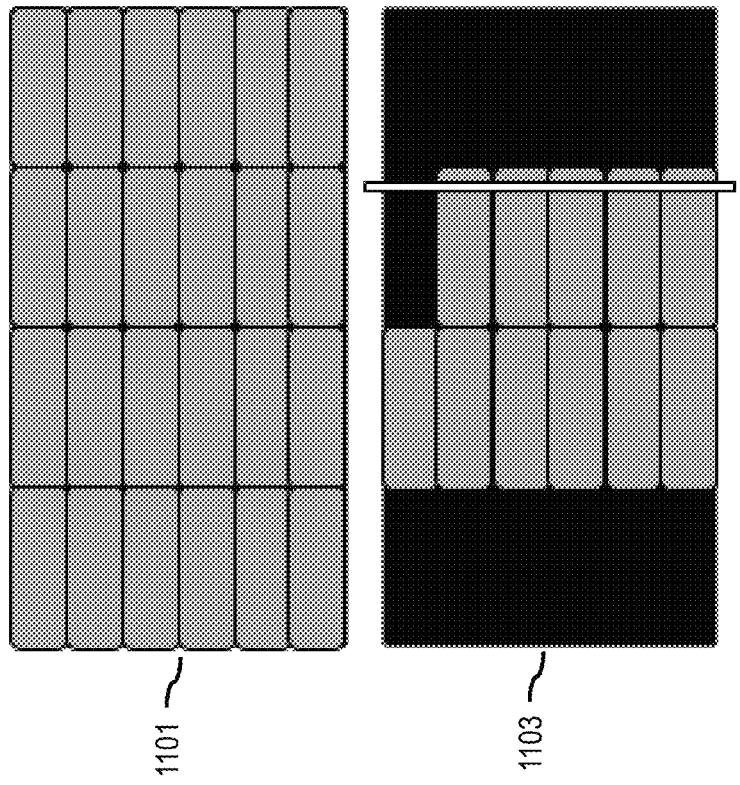

Inspect and mark the regions by density
Process regions from dense to sparse
Mark regions as frozen once processed
    IF POIs
        on a horizontal border
            AND cross more than 50% into the other region,
            AND the adjacent region is unfrozen
                THEN POI position moved into the adjacent region minus the 10% overlap FIGS. 11A and 11B are diagrams depicting a slicing de-overlapping approach, according to various embodiments. FIG. 11A depicts a UI 1101 that illustrates a display in which POI representations have been sized to file the screen with a matrix of 6×4 POI representations. The UI 1101 illustrates, for instance, a maximum capacity of non-overlapping POI representations capable of fitting into the available display area. In one embodiment, the display manager 109 performs the slicing de-overlapping approach starting from one edge of the display to the opposite edge (e.g., bottom to top edge). By moving systematically from one edge to the opposite edge, the display manager 109 can avoid creating unprocessed overlaps.

The UI 1103 illustrates an example of how the display area may be segmented into regions. The vertical line represents a boundary between two regions. Given the same display area and POI representation configuration (e.g., 6×4 matrix as described above), the display manager 109 can divide the display area (e.g., a camera viewfinder field of view) into, for instance, equal regions where each region=2×(POI width)−2×(permitted overlap—e.g., 10% of a POI width).

FIG. 11B illustrates a UI 1111 that as been divided into regions as described above. As a result, the UI 1111 has been divided into two equal regions. In this example, the display manager 109 inspects and marks the regions by density so that the manager 109 can process the regions from dense to sparse regions. After processing each region, the display manager 109 marks the region as frozen. As part of the processing, the display manager 109 can apply the following example logic: if POI representations are (a) on a border, (b) crosses more than 50% into another adjacent region, and/or (c) the adjacent region is unfrozen then the display manager 109 moves the POI representation into the adjacent region minus the allowed overlap (e.g., 10%) as shown in UI 1113.

Figure 12:
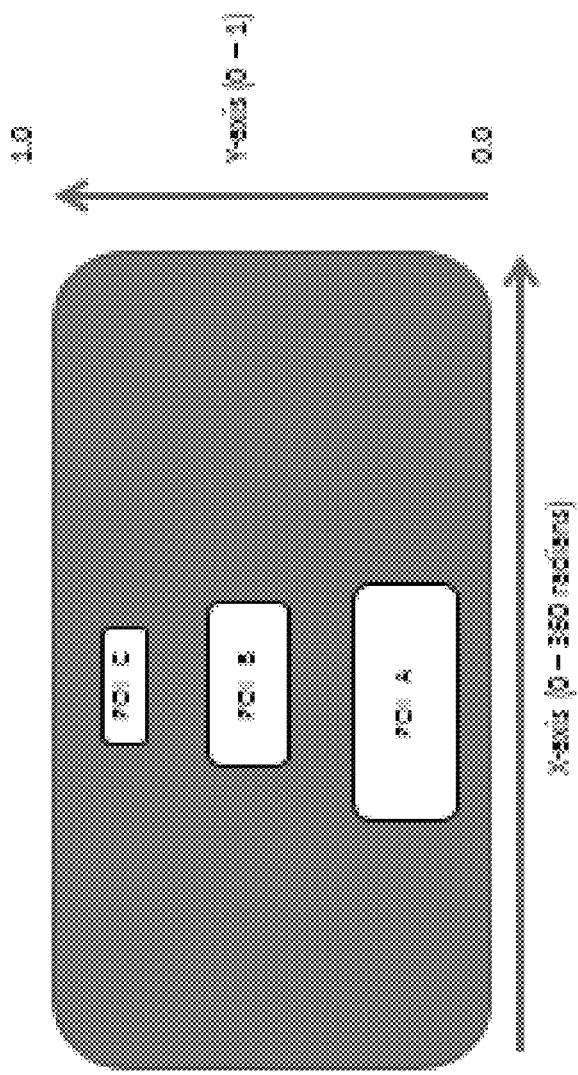
FIG. 12 is a diagram of a process for determining a rendering size for POI representations, according to one embodiment.

FIG. 12 is a diagram of a process for determining a rendering size for POI representations, according to one embodiment. In one embodiment, the display manager 109 can create more available display area by, for instance, taking into account the perspective of a viewing location when rendering items in a perspective display. More specifically, the display manager 109 can provide for POI distance representation. In one embodiment, as shown in FIG. 12, POIs representations that are further away from the viewing location are rendered in a smaller size than closer POI representations. In another embodiment, further POI representations can also be rendered nearer the top of the perspective display with closer POIs being rendered lower in the display. In some embodiments, the display manager 109 can employ nonlinear height separation (e.g., by rendering closer POI representations with more separation). By way of example, near distance POIs (NDP) are POIs within x distance range to the viewing location (e.g., as determined by a location sensor such as a GPS sensor). Similarly, far distance POIs (FDP), POIs within x distance range between 0 and 1 from the viewing location. In one embodiment, the sizing of the POI representations and/or the separation of the representations can be configured based on the available display area, field of view, screen resolution, etc.

Figure 13A:
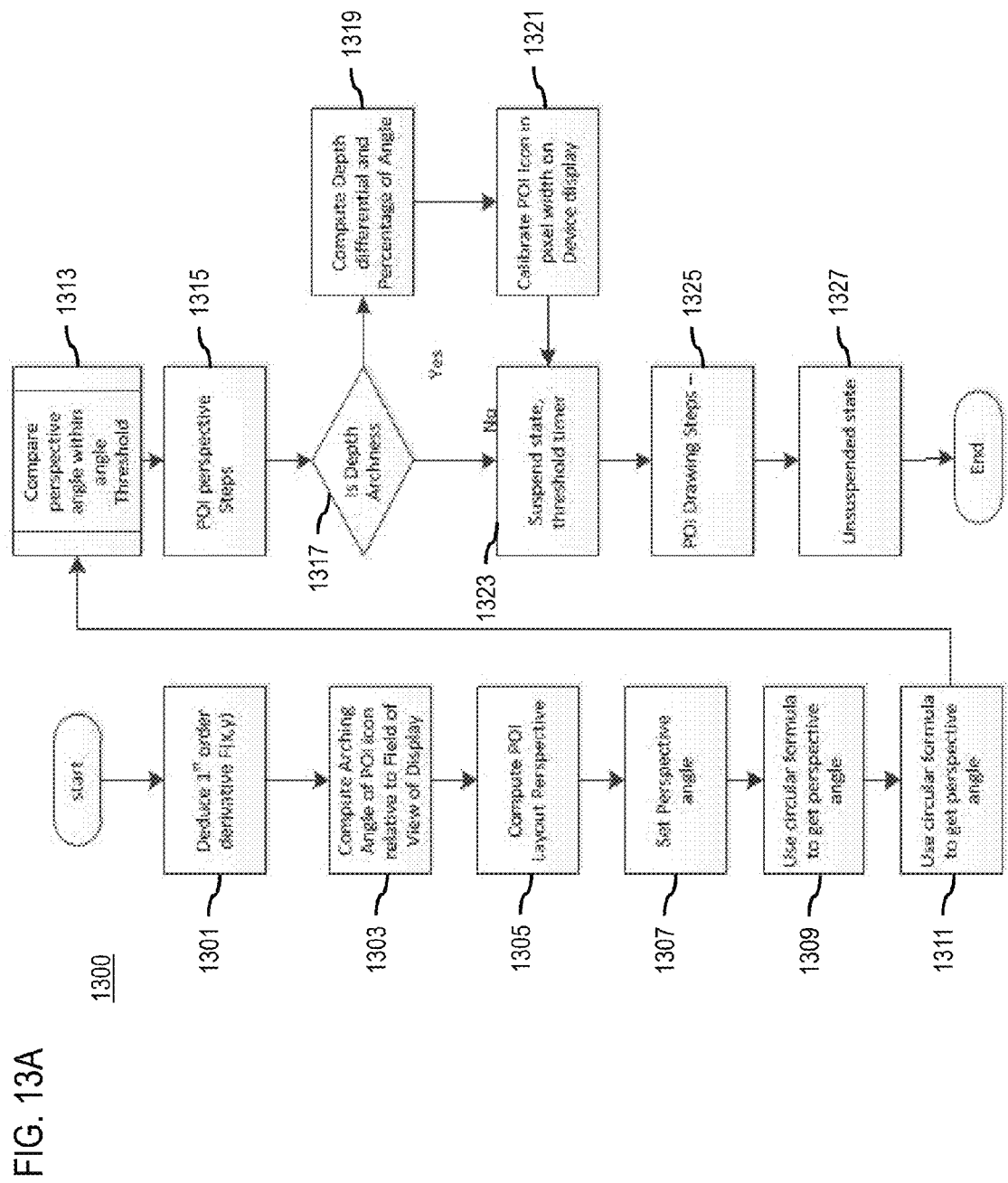
FIG. 13A is a flowchart of a process for rendering POI representations based on an arching perspective, according to one embodiment.

FIG. 13A is a flowchart of a process for rendering POI representations based on an arching perspective, according to one embodiment. In one embodiment, the display manager 109 performs the process 1300 and is implemented in, for instance, a chip set including a processor and a memory as shown FIG. 23. In certain embodiments, the map platform 103 may alternatively perform some or all of the steps of the process 1300 and communicate with the UE 101 using a client server interface.

In one embodiment of the process 1300, the display manager 109 processes and/or facilitates a processing of a viewing location associated with the perspective display to determine a viewing perspective. The display manager 109 then causes, at least in part, a transformation of the one or more POI representations in the perspective display based, at least in part, on the viewing perspective, the one or more rendering locations of the POI representations, or a combination thereof. In other words, the goal of the transformation is to render the perspective view to reflect a cylindrical or spherical view of the world. In one embodiment, the transformation involves varying or rotating the POI representation along one or more of three axes.

In step 1301 of the process 1300, the display manager 109 deduces a first order derivative of F(x,y) to determine a cylindrically based spatial positioning and to apply a simulated perspective to the POI representation. The display manager 109 then computes an arching angle of the POI representation related to the field of view of the display (step 1303). This enables the computation of the POI layout perspective (step 1305). Based on the layout, the display manager 109 sets a perspective angle (step 1307) by, for instance, using a circular formula to get the perspective angle (step 1309/1311).

In step 1313, the display manager 109 compares the determined perspective angle to determine whether the angle is within an angle threshold. If the perspective angle is within the threshold, the display manager 109 applies the POI perspective steps (e.g., rotation, arching, etc. as described further below) to simulate the determined perspective angle in the POI representations (step 1315). In one embodiment the angle is computed according to the following equation which is defined with respect to the screen height and width of the display device (e.g., 640 by 480 pixels):

$$\text{angle}(x,y) = a(y)*x^2 + b(y)*x + c(y)$$

where x and y are the pixel coordinates;

x—row-wise pixel coordinate respective to the display screen size (width(x) by height (y))→640 by 480 with aspect ratio 4:3;

y—row-wise pixel coordinate respective to the display screen size (width(x) by height (y))→640 by 480 with aspect ratio 4:3;

A—coefficient for the nonlinear distortion of the y coordinate;

B—coefficient for the linear distortion of the y coordinate; and

C—offset of the y coordinate.

The display manager 109 then determines whether the depth of the archness for the given perspective angle within criteria (step 1317). If yes, the display manager 109 computes the depth differential and percentage of angle (step 1319), and calibrates the POI representation in the pixel width of the device display (step 1321). If the depth of the archness is not within criteria, then the display manager 109 enters a suspend state and initiates a threshold timer (step 1323).

In step 1325, the display manger applies the POI drawing steps to the POI representations (further described below) and enters an unsuspended state (step 1327).

Figure 13B:
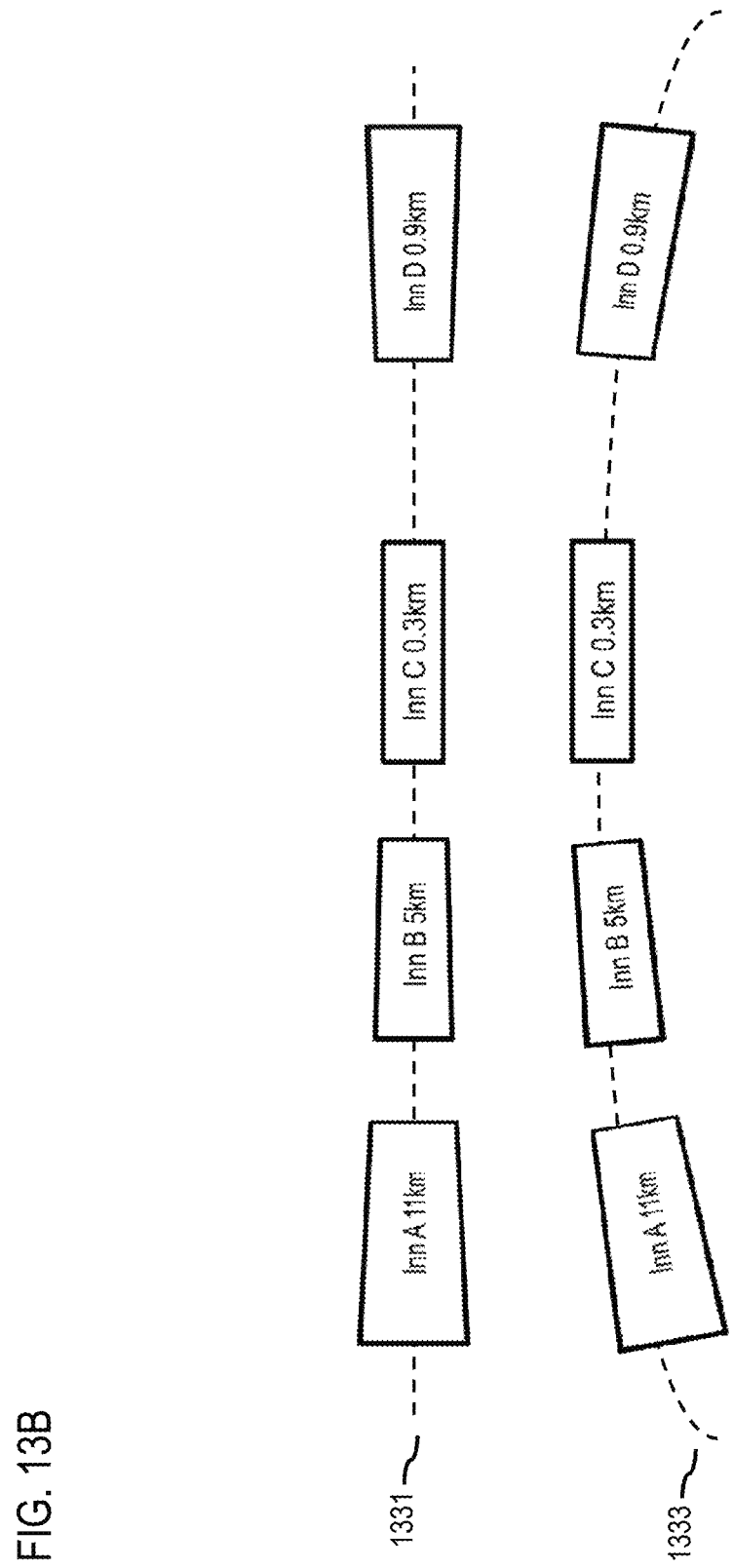
FIGS. 13B-13D are diagrams of rendering POI representations based on an arching perspective, according to one embodiment.

FIG. 13B is a diagram illustrating the steps for adding a simulated perspective to POI representations. The display manager 109 first draws or renders the POI representations 1331 in perspective and determines the POI X rotation. Next, the display manager 109 adds arching and POI Z rotation to complete the simulated perspective effect as shown with POI representations 1333.

Figure 13C:
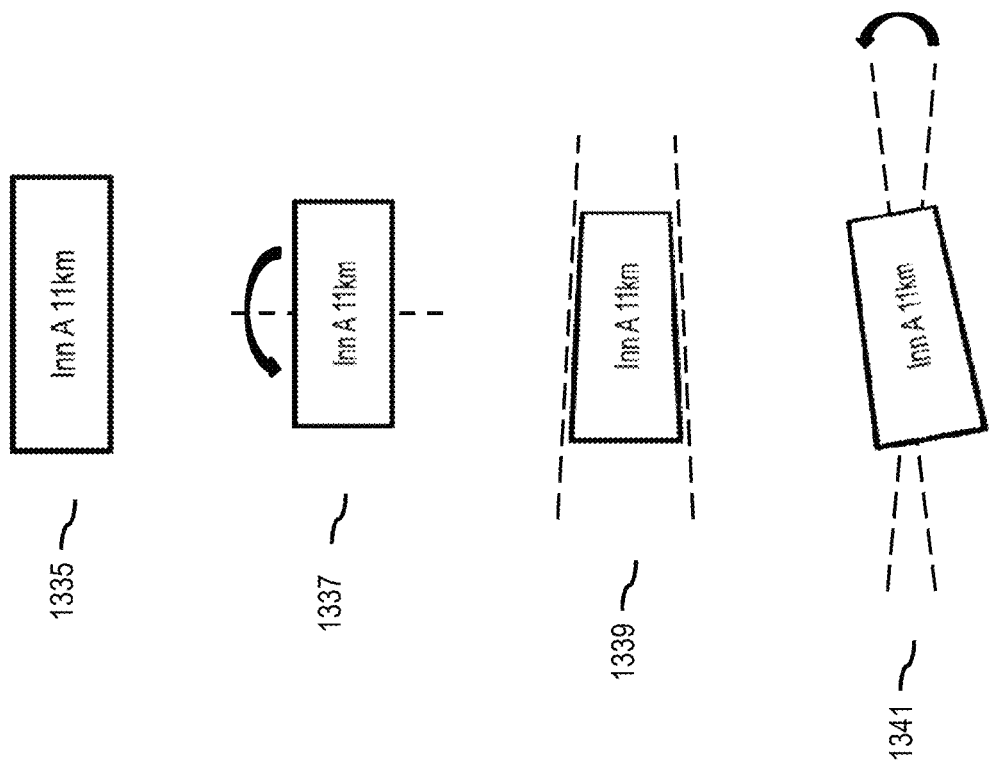

FIG. 13C is a diagram illustrating the drawing steps for simulating perspective on an individual POI representation, according to one embodiment. POI representation 1335 illustrates a plain POI representation that has not undergone the process for adding a simulated perspective. To begin the process, the display manager 109 first adds X rotation as shown with POI representation 1337. The display manager 109 then adds perspective as shown with POI representation 1339. Finally, the display manager 109 adds Z rotation to complete the simulated perspective effect as shown in POI representation 1341.

Figure 13D:

FIG. 13D is a user interface illustrating the application of perspective-based POI representations in an live view augmented reality application, according to one embodiment. As shown, the UI 1345 presents a live view augmented reality display. The display contains a number of POI representations (e.g., both individual and grouped representations). In this example, the display manager 109 has added a simulated perspective effect to the POI representations based on a cylindrical approximation of the real world view. This enables the display manager 109 to more realistically integrate the POI overlays with the live view to enhance the user experience.

Figure 13E:
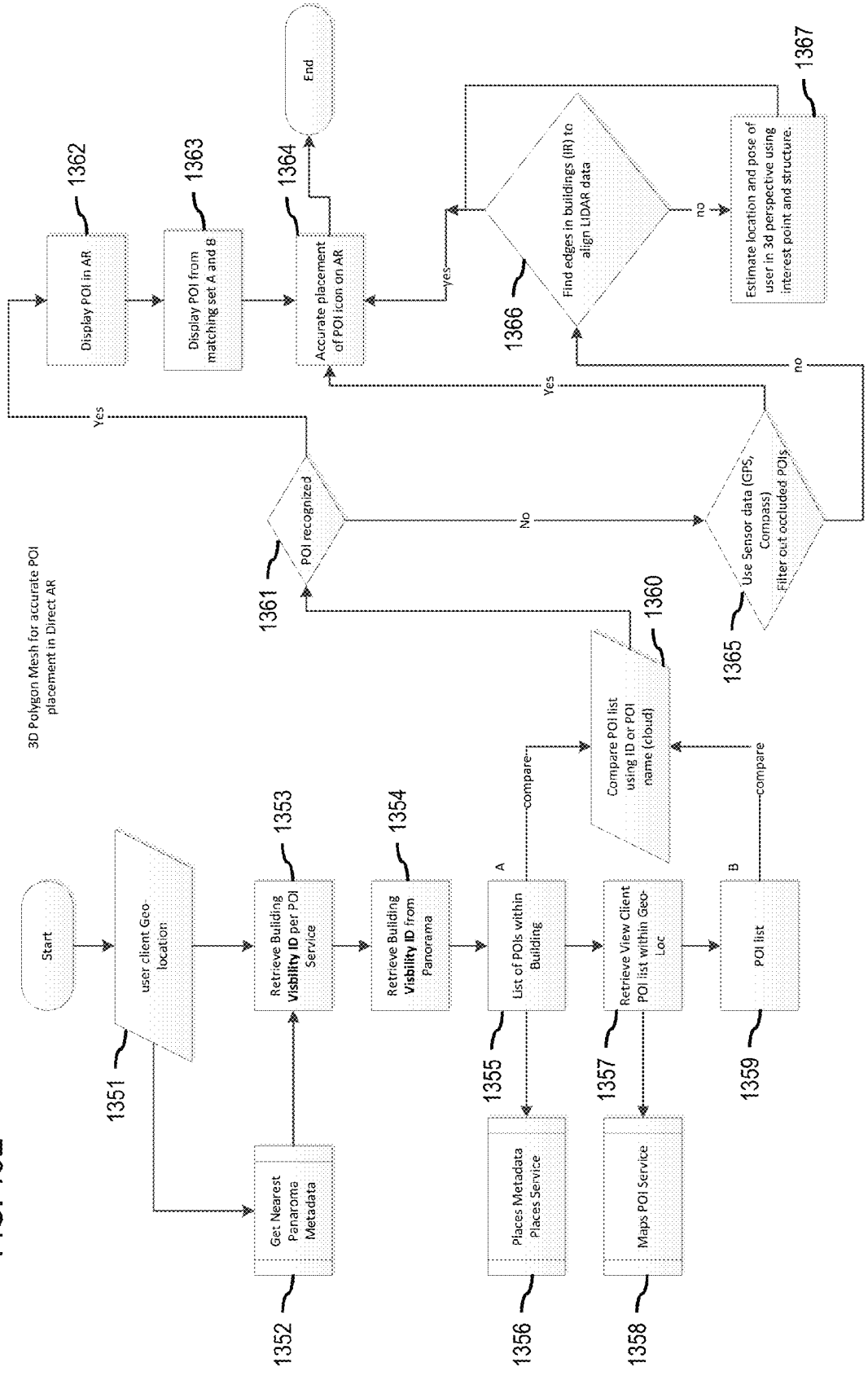
FIGS. 13E-13G are flowcharts of a process for rendering items in a user interface based on determined occlusions, according to various embodiments.
Figure 13F:
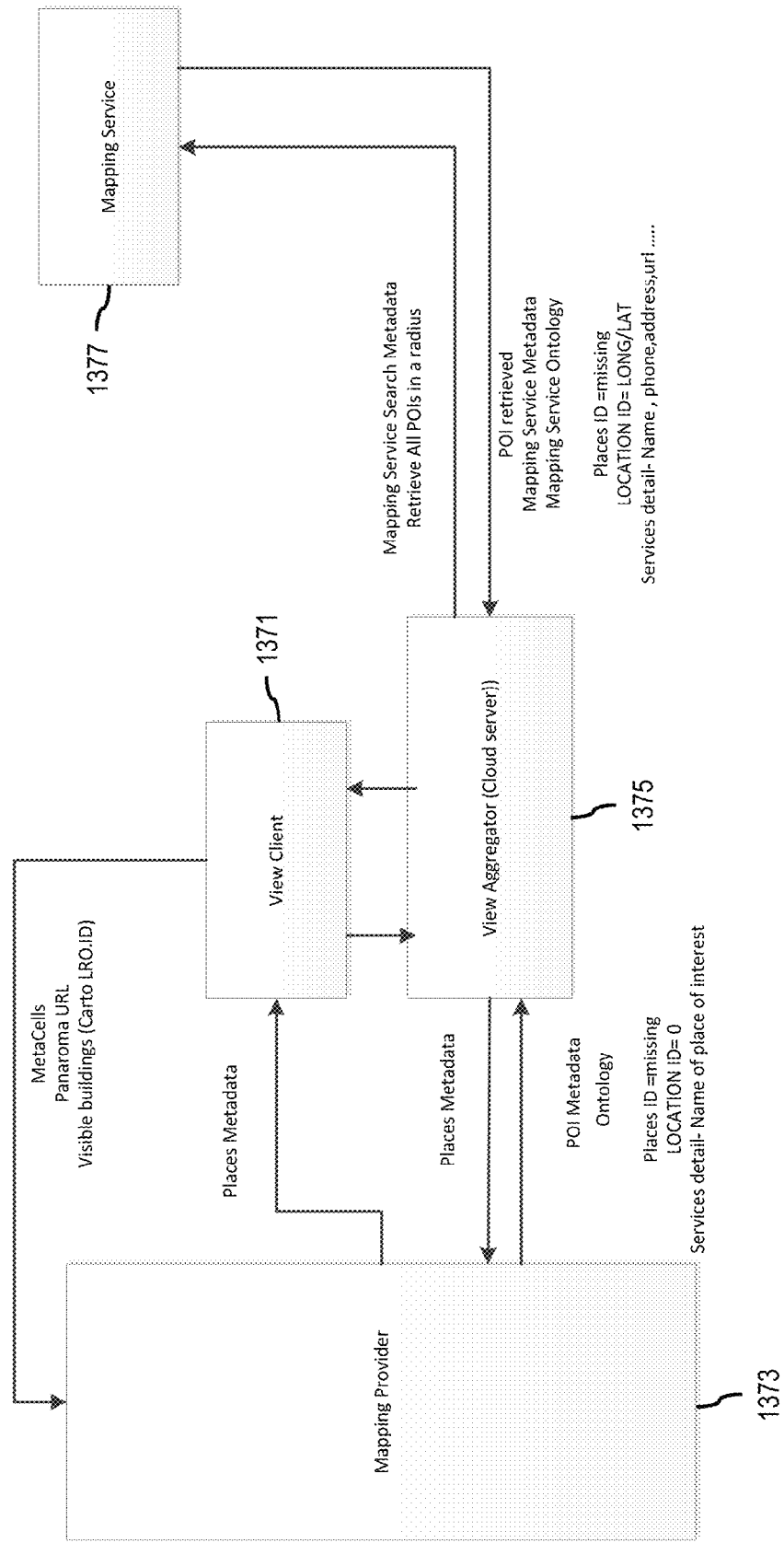
Figure 13G:
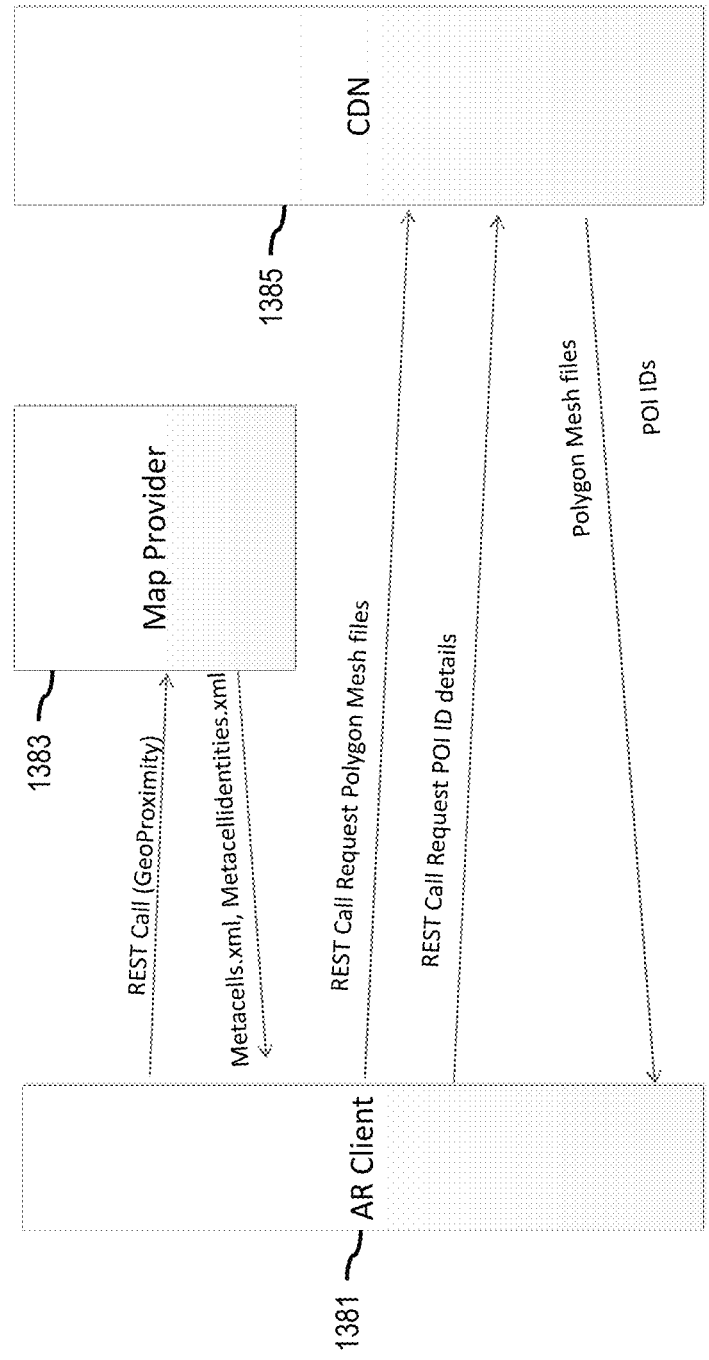

FIGS. 13E-13G are flowcharts of a process for rendering items in a perspective display based on determined occlusions, according to various embodiments. In one embodiment, the display manager 109 performs the processes of FIGS. 13E-13G and is implemented in, for instance, a chip set including a processor and a memory as shown FIG. 23. In certain embodiments, the map platform 103 may alternatively perform some or all of the steps of the processes and communicate with the UE 101 using a client server interface.

To more accurately simulate the real world and reduce POI clutter, the display manager 109 can filter out POI representations in a perspective display that would be occluded by objects or features in the real world when augmenting a display of the real world environment in a perspective-based display. In one embodiment, the display manager 109 processes and/or facilitates a processing of a viewing location associated with the perspective display to determine a viewing perspective. The display manager 109 then determines one or more features depicted in the perspective display, the location-based user interface or a combination thereof, and also determines whether the one or more POI representations are occluded by the one or more features based, at least in part, on the viewing perspective, the one or more rendering locations, or a combination thereof. The one or more representations that are occluded are not rendered in the perspective display.

In one embodiment, the processes of FIGS. 13E-13G can be achieved by leveraging 3D models of the world based on, for instance, polygon mesh supplied by a mapping data provider. For example, retrieving metadata from pre-computed data from depth maps (e.g., distance of buildings to observers) in the form of "visibility information" can be used to deduce the accurate placement of the objects or features (e.g., buildings) from the 3D map data. In one embodiment, this can be coupled with the use of pattern recognition (e.g., image retrieval techniques as supplementary semantic information) to estimate the user pose and perspective position in the terrain and building 3D models (e.g., polygon mesh models). Furthermore, the process of retrieving the metadata from various services can be aggregated at a remote server and the information is processed and sent to the client.

This process is illustrated in FIGS. 13E-13G. As shown in FIG. 13E, at step 1351a user client (e.g., the display manager 109) that is displaying a perspective display obtains its geolocation (e.g., via GPS or other location sensors or services). The display manager 109 then obtains the nearest panorama metadata based on its location (step 1352). At 1353, the display manager 109 retrieves building visibility data (e.g., a visibility ID) from a POI service. The display manager 109 also retrieves building visibility data from the panorama (step 1354). Next, the display manager 109 retrieves a list of POIs with the buildings (step 1355) from a metadata service (step 1356), and a list of POIs near the determined geolocation (step 1357) from a maps POI service (step 1358). This information is used to create a POI list (step 1359) that is then compared to identify the POI or building (step 1360).

In step 1361, the display manager 109 determines whether the POI is recognized from the comparison of step 1360. If the POI is recognized, the display manager 109 displays the POI in the perspective display (step 1362) and displays the matching POIs from the list of POIs within the building and the POI list determine from the maps POI service (step 1363). This leads to an accurate placement of the POI representation or icon in the perspective display (e.g., an augmented reality display).

If, however, the POI is not recognized at step 1361, the display manager 109 can determine whether sensor data can be used to filter out occluded POIs (step 1365). If yes, the display manager 109 proceeds to step 1364 to place the POI representation accurately. If sensor data cannot be used, the display manager 109 can determine whether other data (e.g., LIDAR) can be used to find edges of buildings to determine occlusions (step 1366). If such data (e.g., LIDAR) is available, then the display manager 109 can accurately determine placement of the POI representations. If no LIDAR information is available, the display manager 109 can estimate the location and pose of the user in 3D perspective using interest point and structure data (step 1367) before proceeding to placement of the POI representations.

FIG. 13F illustrates a process of using an aggregator to consolidate data for determining occlusions, according one embodiment. As shown in FIG. 13F, a view client 1371 that is performing the occlusion filtering process can obtain POI, building visibility, related metadata, etc. either directly from a mapping provider 1373 or a view aggregator 1375 (e.g., a cloud service). As shown, the view client 1371 can get direct data (e.g., metacells, panorama URLs, visible building information, and other metadata) from the mapping provider 1373. In addition or alternatively, the view client 1371 can obtain the data from a view aggregator 1375 which can combine the data from the mapping provider 1373 with data from other mapping services 1377 that may not be directly available to the view client 1371.

By way of example, the view aggregator 1375 can obtain data from many different sources in different formats. As part of the aggregation process, the view aggregator 1375 can retrieve mapping service search metadata, POIs within a given area, and other available information. In addition, the view aggregator 1375 may obtain, generate, develop, etc. metadata ontologies to interest and translate mapping data, metadata, etc. among multiple services to maximize the data available for determining possible occlusions and filtering of POI data.

FIG. 13G illustrates the signaling and integration of an augmented reality (AR) client 1381 with a map provider 1383 and a content delivery network 1385. In a first step, the AR client 1381 transmits its geolocation (e.g., via a REST Call (GeoProximity)) to the map provider 1383 to obtain metacell information (e.g., metacells.xml, metacellidentities.xml). In one embodiment, the AR client 1381 can identify nearby POIs based on the metacell information. After making such an identification, the AR Client 1381 can transmit requests for polygon mesh files and POI details (e.g., via REST Call Request Polygon Mesh Files and REST Call Request POI ID details) to a content delivery network (CDN) 1385. The CDN 1385 can then respond with the requested polygon mesh files and POI IDs so that the AR client 1381 can determine or calculate whether there are any potential POI occlusions.

Figure 14:
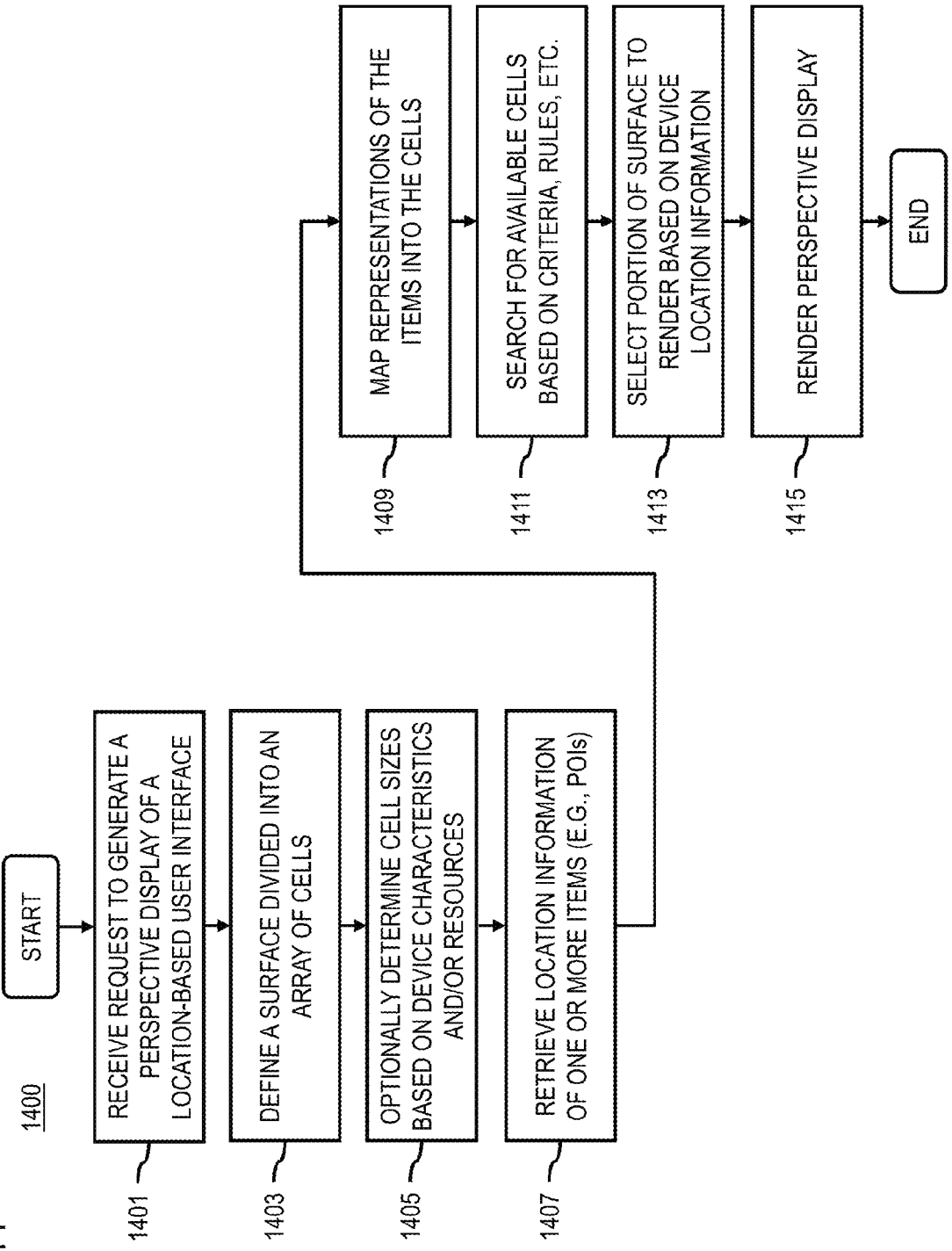
FIG. 14 is a flowchart of a process for generating a perspective display, according to one embodiment.

FIG. 14 is a flowchart of a process for generating a perspective display, according to one embodiment. In one embodiment, the display manager 109 performs the process 1400 and is implemented in, for instance, a chip set including a processor and a memory as shown FIG. 23. The process 1400 provides a general overall process for generating a perspective display that is discussed in more detail with respect to FIGS. 5-11 below. In certain embodiments, the map platform 103 may alternatively perform some or all of the steps of the process 1400 and communicate with the UE 101 using a client server interface. The UE 101 may activate an augmented reality application 107 to generate a perspective display for presentation of POI information. In one embodiment, the augmented reality application 107 may execute upon the runtime module 305.

In step 1401, the display manager 109 receives a request to generate a perspective display of one or more items of a location-based user interface, the request specifying first location information associated with a viewing location. By way of example, the UE 101 may utilize a location module 309, magnetometer module 311, accelerometer module 313, or a combination thereof to determine a viewpoint of the user as previously discussed. In other embodiments, the user may select the viewpoint based on a 3D environment. The user may select the viewpoint based on conventional means of searching a map or 3D map (e.g., by selecting a starting point and traversing the map or entering location coordinates, such as GPS coordinates or an address, of the viewpoint).

In step 1403, the display manager 109 then determines to define a surface with respect to the first location information, wherein the surface is divided into an array of cells. In one embodiment, the surface represents a layer where representations of POI information are to be "projected" for rendering. In various embodiments of the approach described herein, the surface is a cylinder with the viewing location as the center of the cylinder. It is also contemplated that any other volumetric or 3D shape can be used as the projection surface (e.g., a sphere, a cube, a cone, etc.). The surface is divided into, for instance, an array of cells. In one embodiment, the cells are form regular grid patterns. However, it is contemplated that the cells can be of any shape and need not be uniform in either size or shape. In one embodiment, the display manager 109 may determine the cell sizes and/or shapes based on one or more characteristics and/or resources of the device (step 1405). For example, if a mobile device has a larger screen, more cells (e.g., with smaller cell sizes) can be determined. If the device supports a resource such as a touch interface, the cells may be selected to be of sufficient size to enable selection by touch. If the mobile device has more processing power, then more complex shapes or more cells can be determined without affecting overall performance. In other words, the display manager 109 determines one or more other characteristics of the surface, the array, the cells, the one or more representations, or a combination thereof based, at least in part, on the characteristics and/or resources of the device that is to present the perspective display.

Next, the display manager 109 retrieves second location information associated with one or more items (e.g., POIs) for presentation in a perspective display (step 1407). As previously discussed this second location information can retrieved and then cached from the map platform 103. The display manager 109 then processes and/or facilitates a processing of second location information associated with the one or more items to map one or more representations of the one or more items onto one or more of the cells (step 1409).

From the selected viewpoint, the runtime module 305 can render a mapping display depicting a location including one or more POIs or other mapping information. More specifically, the POIs or mapping information are rendered in the mapping display based on the location information associated with each of the POIs. In other words, the POIs are rendered in the mapping display to reflect their actual locations in the geographical area depicted in the mapping display (step 1401). In one embodiment, the mapping process includes determining that at least one of the cells to which one of the representations is to be mapped is already mapped to another one of the representations and then determining to initiate a search for another one of the cells according to one or more criteria, one or more rules, or a combination thereof, wherein the another one of the cells has not been mapped (step 1411). In another embodiment, the display manager 109 can determine not to present the one representation to be mapped in the perspective display if the search does not find another one of the cells. Moreover, in some embodiments, the search is conducted according to a search matrix, a search sequence, or a combination thereof with respect to the one or more cells.

In step 1413, the display manager 109 processes and/or facilitates a processing of the first location information to determine at least a portion of the surface to cause, at least in part, rendering of the perspective display. In another embodiment, the display manager 109 can determine at least one change to the first location information and then process and/or facilitate a processing of the at least one change to initiate generation of the perspective display, the defining of the surface, the mapping of the one or more representations, the determining of the at least a portion of the surface, or a combination thereof (step 1415).

By way of example, if the at least one change relates to panning information, zooming information, and/or the like without a corresponding movement away from the viewing location, the display manager 109 can just process and/or facilitate a processing of the panning information, the zooming information, or a combination thereof to determine the at least another portion of the surface to render. In this way, the display manager 109 need not remap the POI information, but can just select another portion of the surface to view that reflects the new orientation information.

If, however, the at least one change relates a change in coordinate information (e.g., a "Big Move" to a location more than a threshold distance from the current viewing location), the display manager 109 can regenerate and remap the POI information based on the new location information to repeat the steps of the process 1400 to generate and render the perspective display.

As previously noted, the perspective display can represent a physical environment, which may be captured using an image capture module 117 of the UE 101 to provide an augmented reality display. In another embodiment, the image may represent a virtual 3D environment, where the user's location in the real world physical environment is represented in the virtual 3D environment. In the representation, the viewpoint of the user is mapped onto the virtual 3D environment. Moreover, a hybrid physical and virtual 3D environment may additionally be utilized to present navigational information to the user. The augmented reality application 107 may determine what mapping information to present based on user preferences or other system parameters or settings (e.g., a default setting).

In certain embodiments, the mapping information includes a type (or types) of POI (e.g., a coffee shop) that the user is searching for. In other embodiments, the perspective display may also include navigational information such as a directional indicator to a location that the user is searching for (e.g., a friend, a particular POI, etc.). The location can be determined by querying the map platform 103, which may include location information for POIs and additionally may be capable of tracking the movement of people using dynamic positioning technology (e.g., by detecting the presence of a user via GPS information).

Figure 15:
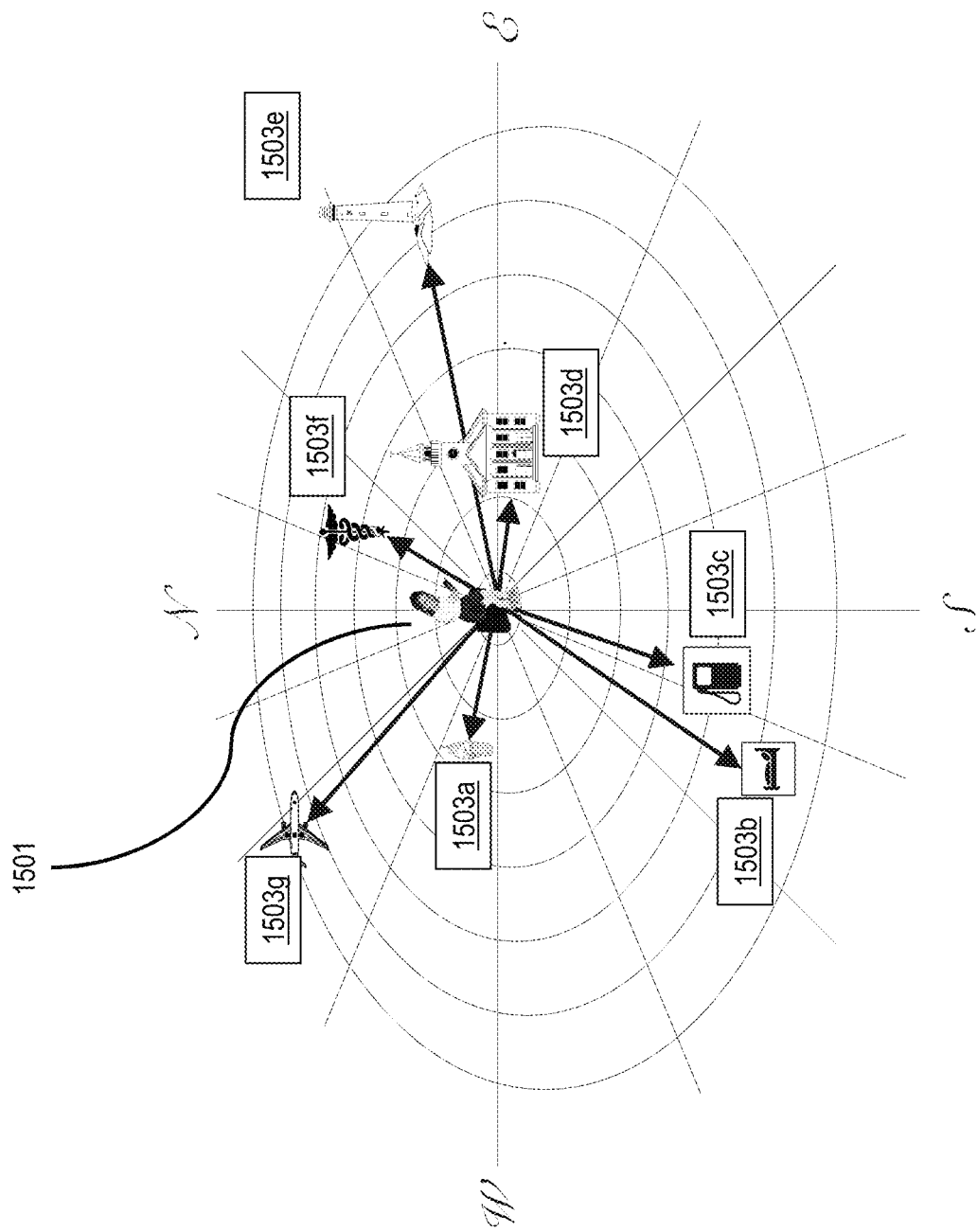
FIG. 15 is a diagram illustrating processing of location information into polar coordinates to support generating a perspective display, according to one embodiment.

FIG. 15 is a diagram illustrating processing of location information into polar coordinates to support generating a perspective display, according to one embodiment. In one embodiment, the display manager 109 converts POI location information into polar coordinates to facilitate mapping onto a surface for representing the POIs. For example if the surface is a cylinder, sphere, or other like object, polar coordinates can more easily specify positions of the mapped representations.

Accordingly, in one embodiment, both the location of the devices and those of the points of interest are given in spherical coordinates measured in degrees of latitude and longitude. The first step is to convert the locations of the points of interest to polar coordinates with the device or viewing location at the center and north from the device as the 0 angle. It is noted that this algorithm assumes that the device is not located near one of the Earth's poles. In one embodiment, an equirectangular projection of latitude and longitude can be used during this conversion to avoid the expense of computations in spherical geometry. This allows the Pythagorean Theorem from plane geometry to be used for distance and standard trigonometry to be used for the angle. As shown in FIG. 15, a user 1501 with a mobile device (e.g., a UE 101) is surrounded by various POIs 1503*a*-1503*g*. The respective bold arrows represent the angle and distance to each POI in the polar coordinate system. The cardinal directions (e.g., North, East, South, and West) are also displayed for reference.

Figure 16:
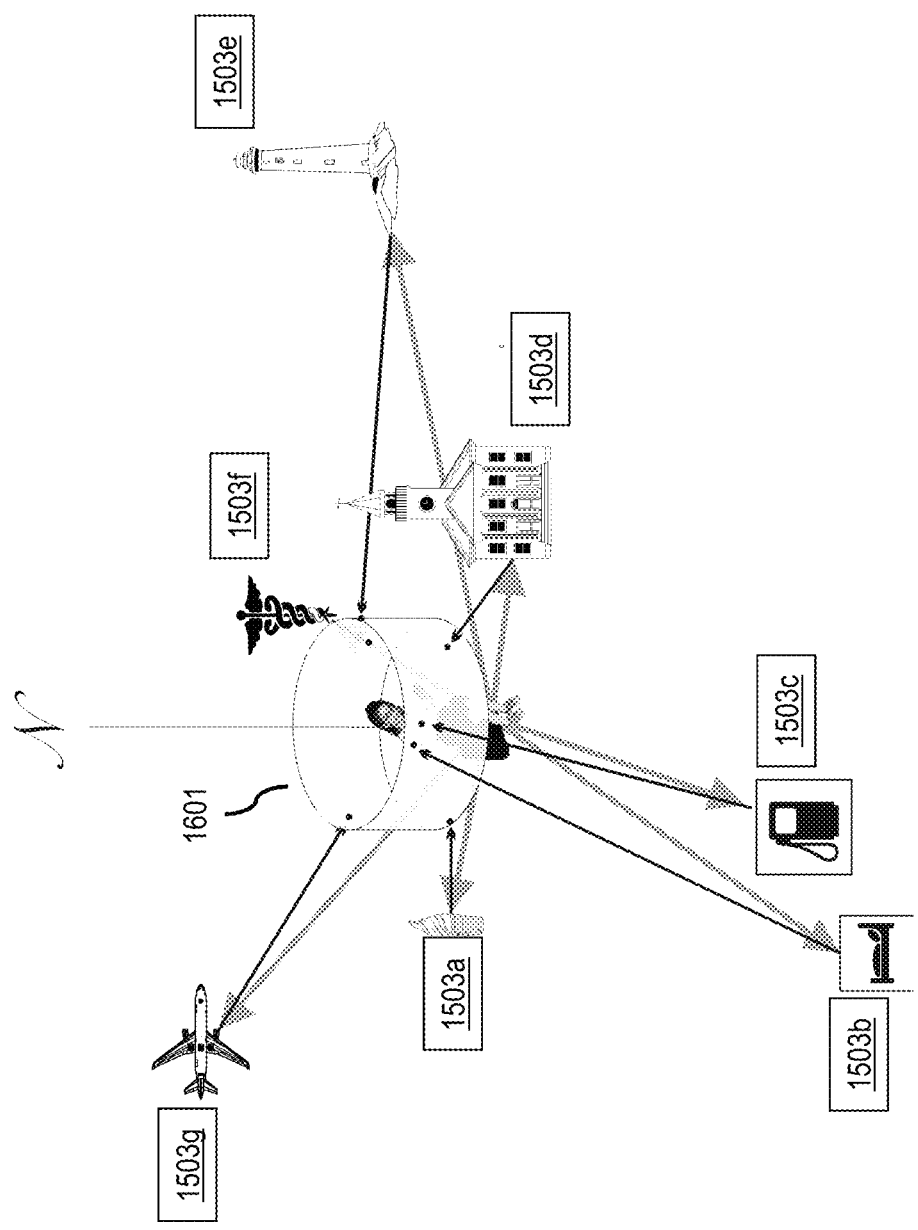
FIG. 16 is a diagram illustrating a process for projecting representations of location items on a surface for generating a perspective display, according to one embodiment.

FIG. 16 is a diagram illustrating a process for projecting representations of location items on a surface for generating a perspective display, according to one embodiment. In this example, the surface is a virtual cylinder 1601. By way of example, the virtual cylinder 1601 is a finite, 2D space represented by pairs of real numbers. One dimension is vertical and the other is horizontal. In one embodiment, for the perspective projection, the vertical dimension does not need any particular unit of measure so the cylinder is simply given a height of 1.0. The horizontal dimension is in degrees measured from north. The POIs 1503*a*-1503*g* can then be mapped or projected onto the cylinder 1601.

With respect to the projection, the polar angle is also the angle for the cylindrical projection. The polar distance is also converted to a perspective height. In one environment, using an artistic perspective, the horizon can be located above the top of the cylinder such that the farthest point of interest (e.g., POI 1503*e*) is at the top of the cylinder (coordinate 1.0). The bottom of the cylinder (coordinate 0.0) can be the location of the nearest point of interest (e.g., POI 1503*a*). In certain embodiments, several different simplifications are possible to avoid or otherwise reduce the computational expense of generating a display from a pure artistic perspective. For example, the log function provides an inexpensive foreshortening of distance with accuracy generally adequate for this problem. As shown in FIG. 16, the lighthouse (POI 1503*e*) is the most distant point of interest from the device and is projected to the top of the cylinder. The ice cream shop (POI 1503*a*) is the closest point of interest to the device and is projected to the bottom of the cylinder. Alternatively, if altitude information is available for the POIs, then the altitude information (rather than distance from the viewing location) can be used to determine the projected heights or POIs 1503*a*-1503*g*.

Figure 17:
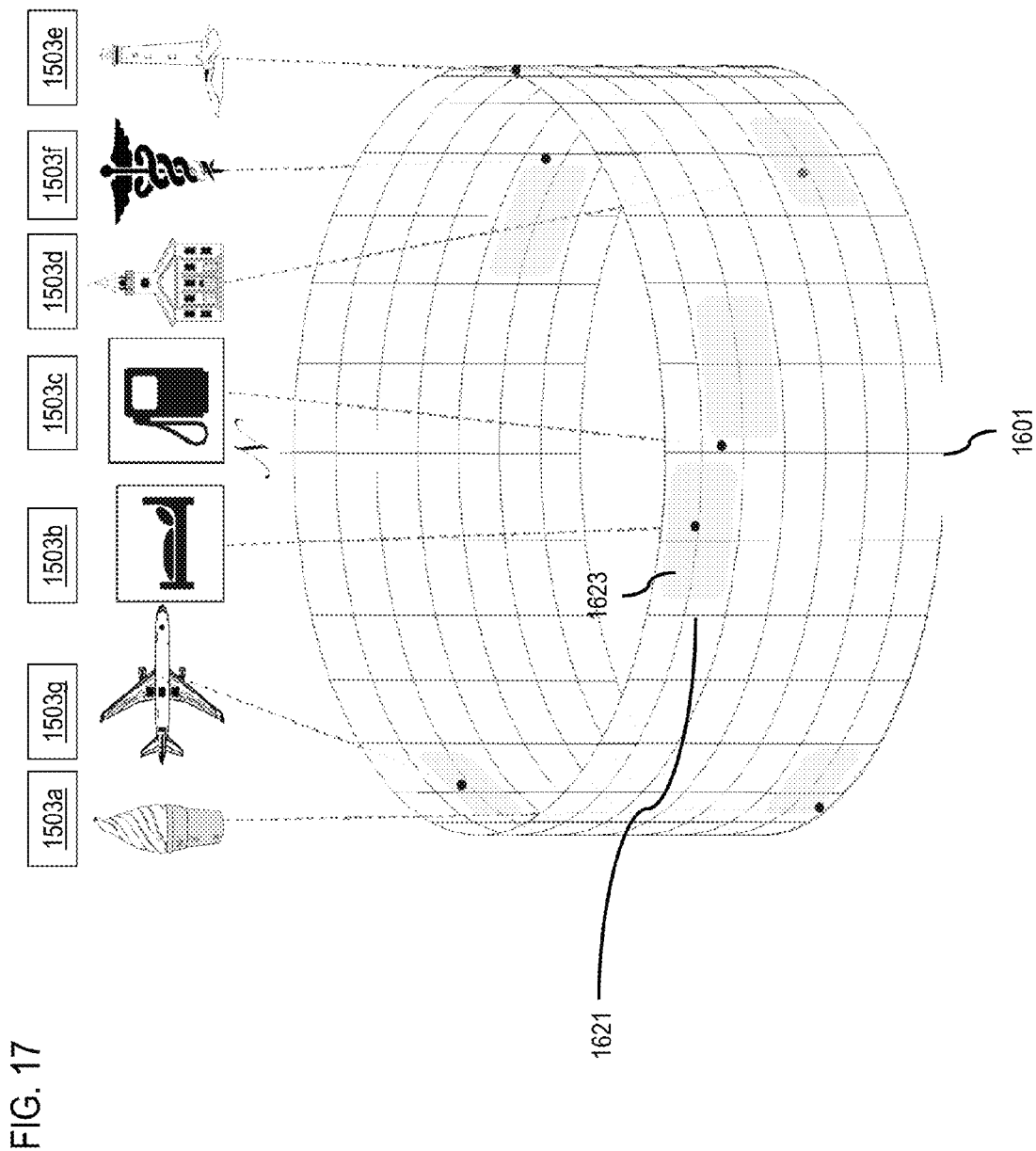
FIG. 17 is a diagram illustrating a process for allocating cells of a surface for generating a perspective display, according to one embodiment.

FIG. 17 is a diagram illustrating a process for allocating cells of a surface for generating a perspective display, according to one embodiment. FIG. 17 illustrates the cylinder 1601 overlaid with a grid seven cells high and twenty-eight cells around. It is noted that the algorithm is independent of the number of cells. For example, the actual number of cells is varied to meet the needs of a particular graphical interface design (e.g., button size for easy touch). Each POI 1503*a*-1503*g* is assigned a distinct rectangular block 1621 of cells. In FIG. 17, each gray patch (e.g., patch 1623) marks a block of four cells assigned to a POI 1503. In one embodiment, the patches 1623 show the desired or recommended output of the algorithm. It is noted that the algorithm is independent of the number of cells in a block 1621. The actual number of cells per block 1621 is varied to meet the needs of a particular graphical interface design. As the number of cells in a block 1621 and the total number of cells increase, blocks (e.g., block 1621) are positioned with finer granularity, but the cost (e.g., resource costs) of locating completely unoccupied blocks increases.

A block 1621 of cells corresponds to a button 1623 on the screen, including any margins around the button 1623. A user interface design typically expresses the button size in terms of pixels. Given the following values:

Hb=the height of the button in pixels, including margins (block height)
Hs=the height of the screen in pixels
Vk=the number of grid cell in a block 1621, vertically
the display manager 109 computes
Vg=the number of grid cells in the cylinder 1601, vertically as follows
Vg=(Hs/Hb)*Vk, rounded to the nearest integer.
Given the following values
Wb=the width of the button in pixels, including margins (block 1621 width)
Ws=the width of the screen in pixels
WC=the width of the camera view in degrees
Zk=the number of grid cells in a block 1621, horizontally the display manager 109 computes Zg=the number of grid cells in the cylinder 1601, horizontally using intermediate values Wp=the width of a pixel in degrees Wg=the width of a grid cell in degrees as follows Wp=Wc/Ws Wg=Wp*Wb*Zk Zg=360/Wg, rounded to the nearest integer In some cases, because of integer rounding, the actual size of the buttons and their margins may vary somewhat from the original specification.

In one embodiment, the layout algorithm favors POIs 1503 that are closer to the viewing location by placing them first on the grid; to accomplish this, the POIs 1503 are sorted by distance after they are assigned cylindrical coordinates. In one embodiment, the preferred block 1621 for a POI 1503 is the one where the point of interest falls in the upper-left cell of the block. Two points of interest in FIG. 17 are given blocks 1621 that fail to meet this definition of a preferred block. The ice cream shop's (e.g., POI 1503$a$'s) preferred block extends off the bottom of the grid, so the block one element up is selected. The motel's (e.g., 1503$b$'s) preferred block overlaps that of the gas station which is closer to the mobile device, so the block one element to the left is selected.

Figure 18A:
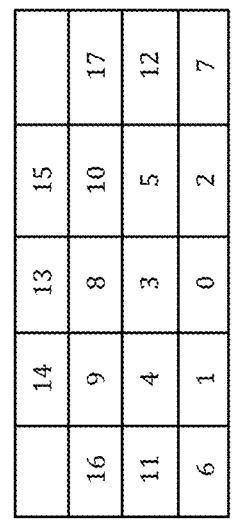
FIG. 18A is diagram of a cell search matrix for generating a perspective display, according to one embodiment.

FIG. 18A is diagram of a cell search matrix for generating a perspective display, according to one embodiment. Generally, once a POI 1503 is assigned a block 1621, the assignment is not changed. If the preferred block 1621 for a farther POI 1503 overlaps an occupied grid element, the layout algorithm searches for a nearby block of empty elements or cells. In one embodiment, a search pattern is represented as a 2-D matrix 1801 containing sequential search numbers starting from 0. For example, the position 1803 with search number 0, represents the relative location, in grid elements, of the preferred block 1621 for a POI 1503; suppose a position in the matrix is delta-X, delta-Y away from the preferred block 1621 and contains number n. Then step n of the search looks at the position delta-X, delta-Y away from the preferred block 1621 in the grid to see if it is occupied. As shown, empty positions in the matrix are outside the search. FIG. 18A is an example of a search matrix for a search with 17 steps.

FIG. 18B is a diagram of a cell search sequence for generating a perspective display, according to one embodiment. FIG. 18B is a sequence 1821 of relative locations to check, based on the search matrix 1801 of FIG. 18A. The search matrix 1801 is an intuitive, user-friendly, representation. The search sequence 1821 is suitable for a computer algorithm. The conversion from the human-friendly form to the algorithm-friendly form can be automated. This allows the search matrix to be a convenient input to the algorithm, along with grid and block sizes. Altering the location of numbers in the search matrix 1801 changes the preferential direction of movement for resolving overlaps. Increasing the number of search steps allows more movement and thus the display of more points of interest that occur in a tight cluster. In one embodiment, the search matrix 1801 is tuned to meet the needs of a particular implementation of virtual reality.

Figure 19A:
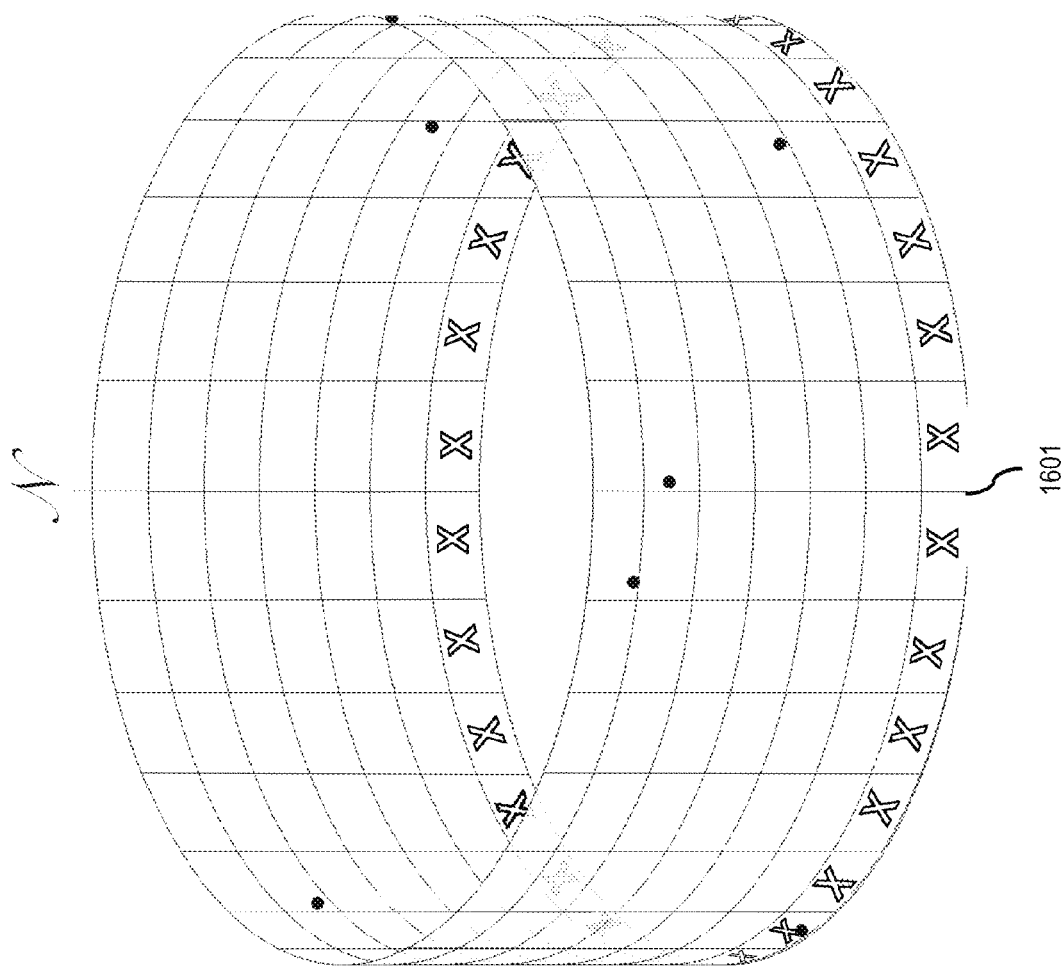
FIGS. 19A and 19B are diagrams illustrating a process for allocating cells of a surface for generating a perspective display, according to one embodiment.
Figure 19B:
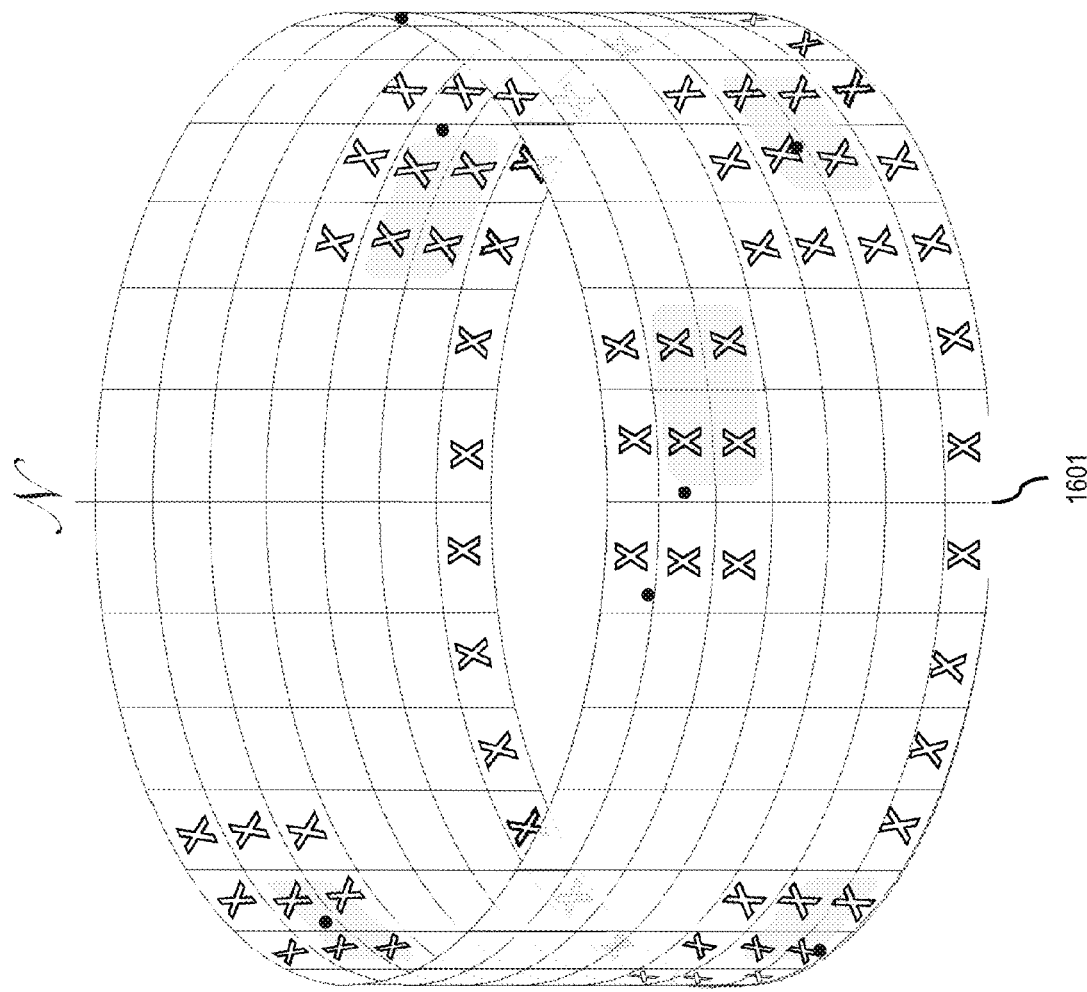

FIGS. 19A and 19B is a diagram illustrating a process for allocating cells of a surface for generating a perspective display, according to one embodiment. The layout algorithm tracks the grid elements where no future blocks 1621 can be located; specifically where the upper left corner of the block 1621 cannot be located. If a block 1621 is m grid elements height, then initially, the lowest n−1 elements of the grid are marked as unavailable as shown with X's in FIG. 19A for a block 1621 that is two elements high. FIG. 19A demonstrates the first step toward producing the results in FIG. 17 above. The first POI 1503$a$, the ice cream shop, is located in a grid element that is marked as unavailable. Steps 1 and 2 of the search sequence also produce marked elements in the bottom row, but step 3 produces an unmarked element in row 2, so that block 1621 is used. For an n by m, block, the (2n−1) by (2m−1) rectangle of cells anchored at the lower right of the block are now mark as unavailable (e.g., with X's).

FIG. 19B shows the grid of the cylinder 1601 after the first five POIs 1503 are assigned 2 by 2 blocks of cells. The sixth POI 1503$b$, the motel, is located in an element marked as unavailable. In an example use case, step 1 of the search sequence 1821 produces an unmarked block one element to the left. In the example of FIG. 19B, all POIs 1503 are successfully assigned blocks using the search sequence 1821. In cases where many POIs 1503 are clustered, some will exhaust the search sequence 1821 without finding unmarked blocks. In one embodiment, those POIs 1503 are discarded and not displayed.

Modifications can be made to the grid layout algorithm to allow POIs 1503 near the top of cylinder to occupy smaller blocks than those at the bottom of the cylinder 1601, furthering the theme of artistic perspective. An alternative to discarding POIs 1503 where there is too much clustering is to replace a set of POIs 1503 with a single composite block representing multiple POIs. The composite block would be presented to the user interface as a different kind of object than a single POI 1503.

Figure 20:
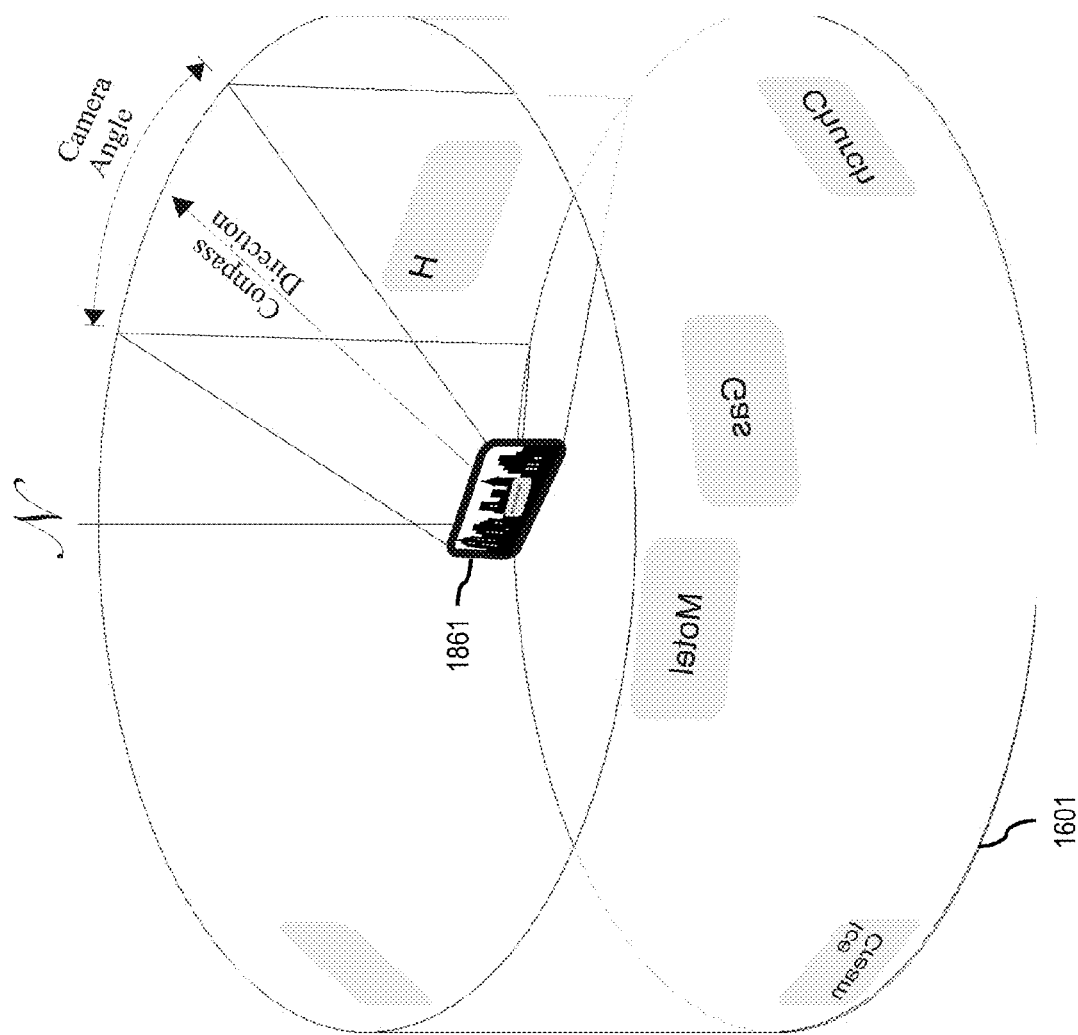
FIG. 20 is a diagram illustrating a process for selecting a portion of a surface for generating a perspective display, according to one embodiment.

FIG. 20 is a diagram illustrating a process for selecting a portion of a surface for generating a perspective display, according to one embodiment. In one embodiment, once all POIs 1503 are laid out in the cells, they are sorted by angle to aid in their display. FIG. 20 illustrates how the compass direction and camera angle are used to select, from the virtual cylinder 1601, POIs 1503 for display. In one embodiment, simple geometry is used to map the virtual coordinates to pixel coordinates on the display 1861. For example, the details of how the points of interest are rendered over the camera viewfinder image are determined by the particular graphical design.

Figure 21A:
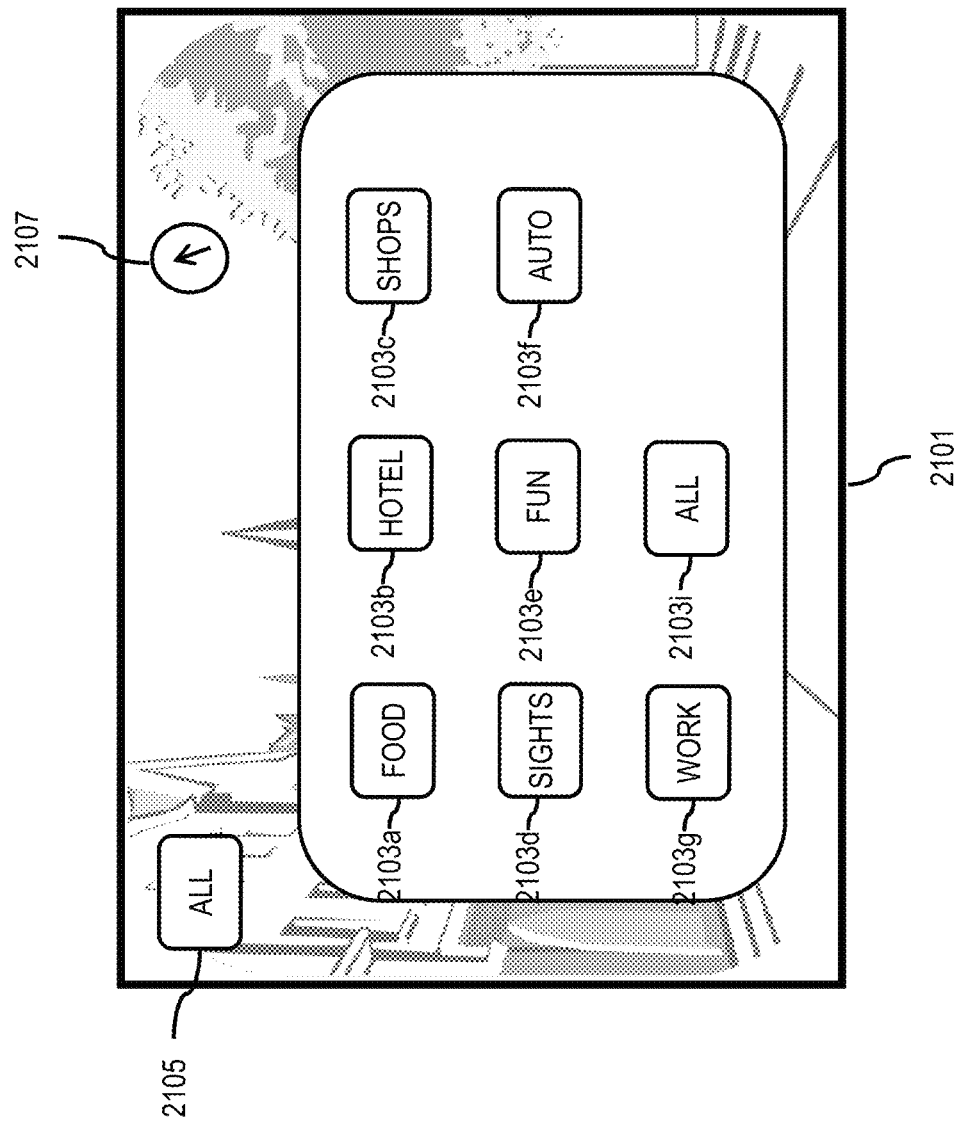
FIGS. 21A and 21B are diagrams of user interfaces utilized in the processes of FIGS. 14-20, according to various embodiments.
Figure 21B:
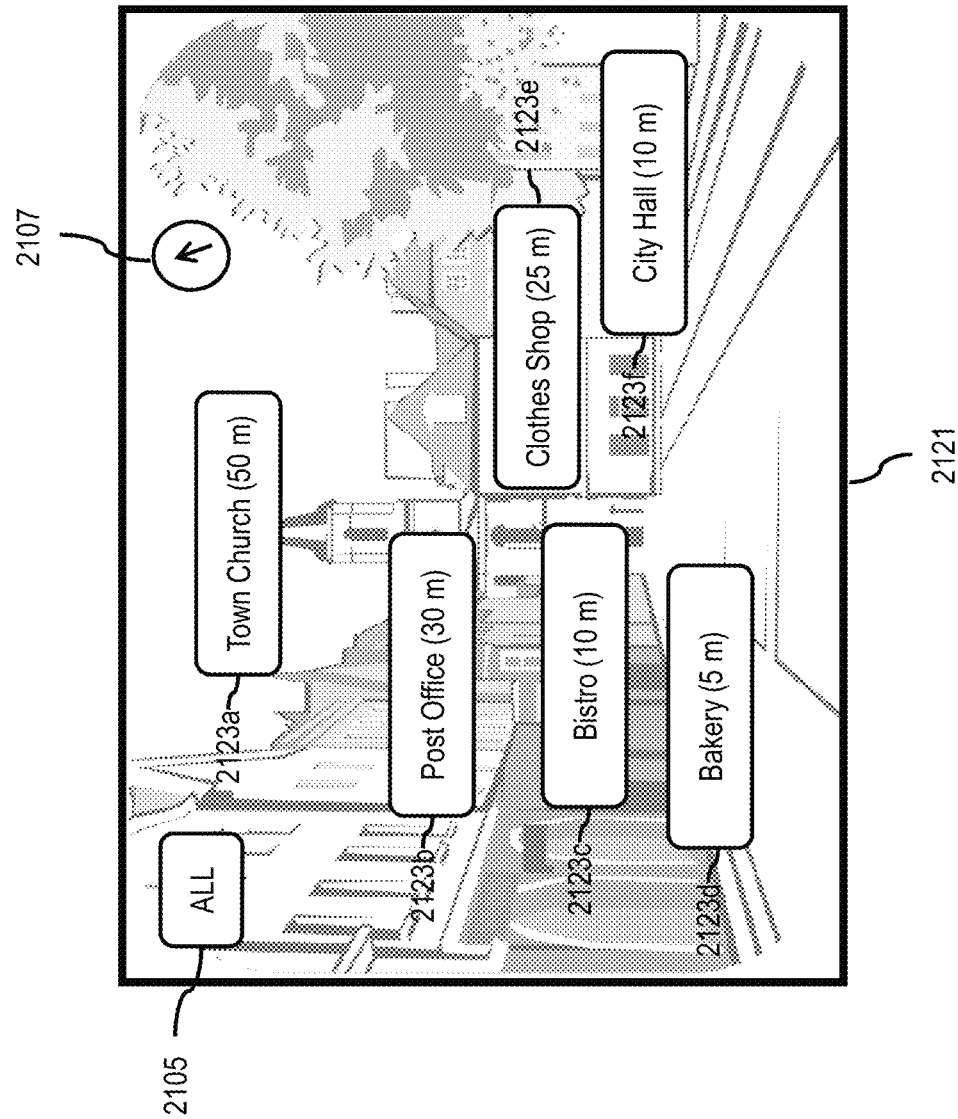

FIGS. 21A and 21B are diagrams of user interfaces utilized in the processes of FIGS. 14-20, according to various embodiments. FIG. 21A represents a main menu screen 2101 for configuring a perspective display (e.g., an augmented reality display). More specifically, the main menu screen includes a selection of POI categories 2103$a$-2103$i$ that can be used to filter for one or more of the POI categories 2103 for presentation in the perspective display. In this example, the user has selected 2103$i$ to view all POIs 1503 without filtering. Accordingly, the notification 2105 displays the selected "All" preference for viewing information in the perspective display. If the user selects a category, POIs 1503 associated with the other non-selected categories will be hidden and not presented in the perspective display. As shown, the main menu screen also displays a compass 2107 to indicate the current orientation of the viewing device or location.

FIG. 21B depicts a user interface 2121 for browsing POI information in an augmented reality display or browser. In this example, the augmented reality display is configured to show all types of nearby POIs 2123$a$-2123$f$ as indicated by the notification 2105. As shown, the user interface is displaying six POIs 2123$a$-2123$f$ representing shops, restaurants, post office, government buildings, and the like. The POIs are also displayed according to distance from the viewer with closer POIs displayed lower on the screen and farther POIs displayed higher on the screen. The display manager 109 has also rearranged at least one of the representations to prevent overlap. For example, the POI 2123c Bistro and the POI 2123f City Hall are both 10 m from the viewer and should be displayed at the same height relative to the display. However, because the POI 2123e Clothes Shop, the display manager 109 has searched for and found cells of the display that can still display the POI 2123f at the same general area.

In one embodiment, the POIs 2123 are depicted using button representations to facilitate selection of the POIs 2123 using a touch enabled device. For example, if the user selects POI 2123d Bakery, the display manager 103 and/or the augmented reality browser can display a POI page to provide additional contact information (e.g., phone, address), reviews (e.g., free and premium review services), related content (e.g., photos, audio, mixed media, etc.), and/or the like. As the user pans or zooms the perspective display, the display of the POIs can be updated based on the user's new perspective.

In another embodiment, it is contemplated that the filtering and/or display of the POIs 2123 can be determined or otherwise influenced by, for instance, marketing incentives, marketing campaigns, advertisements, and other promotions.

The processes described herein for grouping and de-overlapping items in a user interface may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 22:
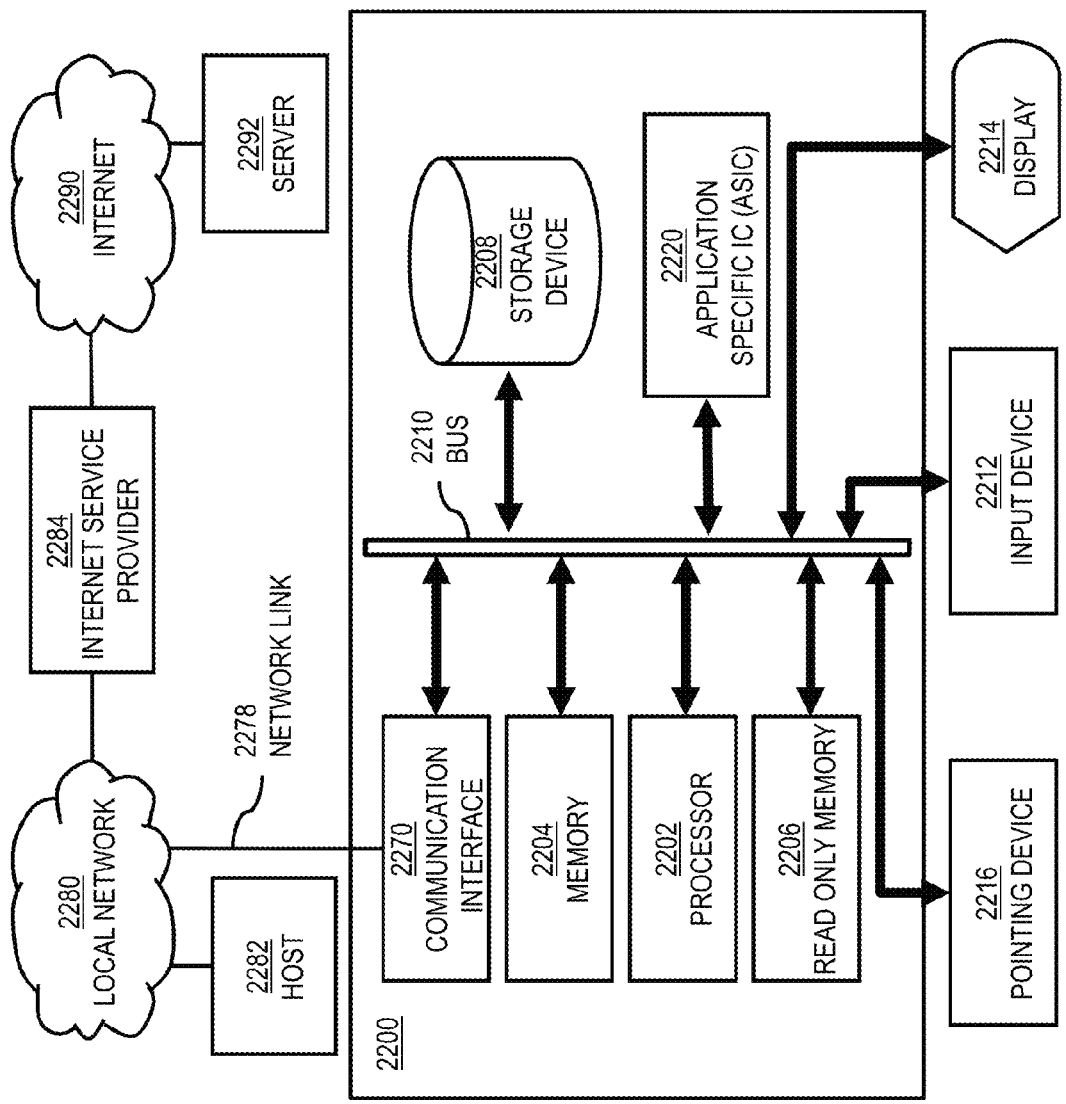
FIG. 22 is a diagram of hardware that can be used to implement an embodiment of the invention.

FIG. 22 illustrates a computer system 2200 upon which an embodiment of the invention may be implemented. Although computer system 2200 is depicted with respect to a particular device or equipment, it is contemplated that other devices or equipment (e.g., network elements, servers, etc.) within FIG. 22 can deploy the illustrated hardware and components of system 2200. Computer system 2200 is programmed (e.g., via computer program code or instructions) to group and de-overlap items in a user interface as described herein and includes a communication mechanism such as a bus 2210 for passing information between other internal and external components of the computer system 2200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 2200, or a portion thereof, constitutes a means for performing one or more steps of grouping and de-overlapping items in a user interface.

A bus 2210 includes one or more parallel conductors of information so that information is transferred quickly among devices coupled to the bus 2210. One or more processors 2202 for processing information are coupled with the bus 2210.

A processor (or multiple processors) 2202 performs a set of operations on information as specified by computer program code related to grouping and de-overlapping items in a user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 2210 and placing information on the bus 2210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 2202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 2200 also includes a memory 2204 coupled to bus 2210. The memory 2204, such as a random access memory (RAM) or any other dynamic storage device, stores information including processor instructions for grouping and de-overlapping items in a user interface. Dynamic memory allows information stored therein to be changed by the computer system 2200. RAM allows a unit of information stored at a location called a memory address to be stored and retrieved independently of information at neighboring addresses. The memory 2204 is also used by the processor 2202 to store temporary values during execution of processor instructions. The computer system 2200 also includes a read only memory (ROM) 2206 or any other static storage device coupled to the bus 2210 for storing static information, including instructions, that is not changed by the computer system 2200. Some memory is composed of volatile storage that loses the information stored thereon when power is lost. Also coupled to bus 2210 is a non-volatile (persistent) storage device 2208, such as a magnetic disk, optical disk or flash card, for storing information, including instructions, that persists even when the computer system 2200 is turned off or otherwise loses power.

Information, including instructions for grouping and de-overlapping items in a user interface, is provided to the bus 2210 for use by the processor from an external input device 2212, such as a keyboard containing alphanumeric keys operated by a human user, or a sensor. A sensor detects conditions in its vicinity and transforms those detections into physical expression compatible with the measurable phenomenon used to represent information in computer system 2200. Other external devices coupled to bus 2210, used primarily for interacting with humans, include a display device 2214, such as a cathode ray tube (CRT), a liquid crystal display (LCD), a light emitting diode (LED) display, an organic LED (OLED) display, a plasma screen, or a printer for presenting text or images, and a pointing device 2216, such as a mouse, a trackball, cursor direction keys, or a motion sensor, for controlling a position of a small cursor image presented on the display 2214 and issuing commands associated with graphical elements presented on the display 2214. In some embodiments, for example, in embodiments in which the computer system 2200 performs all functions automatically without human input, one or more of external input device 2212, display device 2214 and pointing device 2216 is omitted.

In the illustrated embodiment, special purpose hardware, such as an application specific integrated circuit (ASIC) 2220, is coupled to bus 2210. The special purpose hardware is configured to perform operations not performed by processor 2202 quickly enough for special purposes. Examples of ASICs include graphics accelerator cards for generating images for display 2214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 2200 also includes one or more instances of a communications interface 2270 coupled to bus 2210. Communication interface 2270 provides a one-way or two-way communication coupling to a variety of external devices that operate with their own processors, such as printers, scanners and external disks. In general the coupling is with a network link 2278 that is connected to a local network 2280 to which a variety of external devices with their own processors are connected. For example, communication interface 2270 may be a parallel port or a serial port or a universal serial bus (USB) port on a personal computer. In some embodiments, communications interface 2270 is an integrated services digital network (ISDN) card or a digital subscriber line (DSL) card or a telephone modem that provides an information communication connection to a corresponding type of telephone line. In some embodiments, a communication interface 2270 is a cable modem that converts signals on bus 2210 into signals for a communication connection over a coaxial cable or into optical signals for a communication connection over a fiber optic cable. As another example, communications interface 2270 may be a local area network (LAN) card to provide a data communication connection to a compatible LAN, such as Ethernet. Wireless links may also be implemented. For wireless links, the communications interface 2270 sends or receives or both sends and receives electrical, acoustic or electromagnetic signals, including infrared and optical signals, that carry information streams, such as digital data. For example, in wireless handheld devices, such as mobile telephones like cell phones, the communications interface 2270 includes a radio band electromagnetic transmitter and receiver called a radio transceiver. In certain embodiments, the communications interface 2270 enables connection to the communication network 105 for grouping and de-overlapping items in a user interface.

The term "computer-readable medium" as used herein refers to any medium that participates in providing information to processor 2202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 2208. Volatile media include, for example, dynamic memory 2204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 2220.

Network link 2278 typically provides information communication using transmission media through one or more networks to other devices that use or process the information. For example, network link 2278 may provide a connection through local network 2280 to a host computer 2282 or to equipment 2284 operated by an Internet Service Provider (ISP). ISP equipment 2284 in turn provides data communication services through the public, world-wide packet-switching communication network of networks now commonly referred to as the Internet 2290.

A computer called a server host 2292 connected to the Internet hosts a process that provides a service in response to information received over the Internet. For example, server host 2292 hosts a process that provides information representing video data for presentation at display 2214. It is contemplated that the components of system 2200 can be deployed in various configurations within other computer systems, e.g., host 2282 and server 2292.

At least some embodiments of the invention are related to the use of computer system 2200 for implementing some or all of the techniques described herein. According to one embodiment of the invention, those techniques are performed by computer system 2200 in response to processor 2202 executing one or more sequences of one or more processor instructions contained in memory 2204. Such instructions, also called computer instructions, software and program code, may be read into memory 2204 from another computer-readable medium such as storage device 2208 or network link 2278. Execution of the sequences of instructions contained in memory 2204 causes processor 2202 to perform one or more of the method steps described herein. In alternative embodiments, hardware, such as ASIC 2220, may be used in place of or in combination with software to implement the invention. Thus, embodiments of the invention are not limited to any specific combination of hardware and software, unless otherwise explicitly stated herein.

The signals transmitted over network link 2278 and other networks through communications interface 2270, carry information to and from computer system 2200. Computer system 2200 can send and receive information, including program code, through the networks 2280, 2290 among others, through network link 2278 and communications interface 2270. In an example using the Internet 2290, a server host 2292 transmits program code for a particular application, requested by a message sent from computer 2200, through Internet 2290, ISP equipment 2284, local network 2280 and communications interface 2270. The received code may be executed by processor 2202 as it is received, or may be stored in memory 2204 or in storage device 2208 or any other non-volatile storage for later execution, or both. In this manner, computer system 2200 may obtain application program code in the form of signals on a carrier wave.

Various forms of computer readable media may be involved in carrying one or more sequence of instructions or data or both to processor 2202 for execution. For example, instructions and data may initially be carried on a magnetic disk of a remote computer such as host 2282. The remote computer loads the instructions and data into its dynamic memory and sends the instructions and data over a telephone line using a modem. A modem local to the computer system 2200 receives the instructions and data on a telephone line and uses an infra-red transmitter to convert the instructions and data to a signal on an infra-red carrier wave serving as the network link 2278. An infrared detector serving as communications interface 2270 receives the instructions and data carried in the infrared signal and places information representing the instructions and data onto bus 2210. Bus 2210 carries the information to memory 2204 from which processor 2202 retrieves and executes the instructions using some of the data sent with the instructions. The instructions and data received in memory 2204 may optionally be stored on storage device 2208, either before or after execution by the processor 2202.

Figure 23:
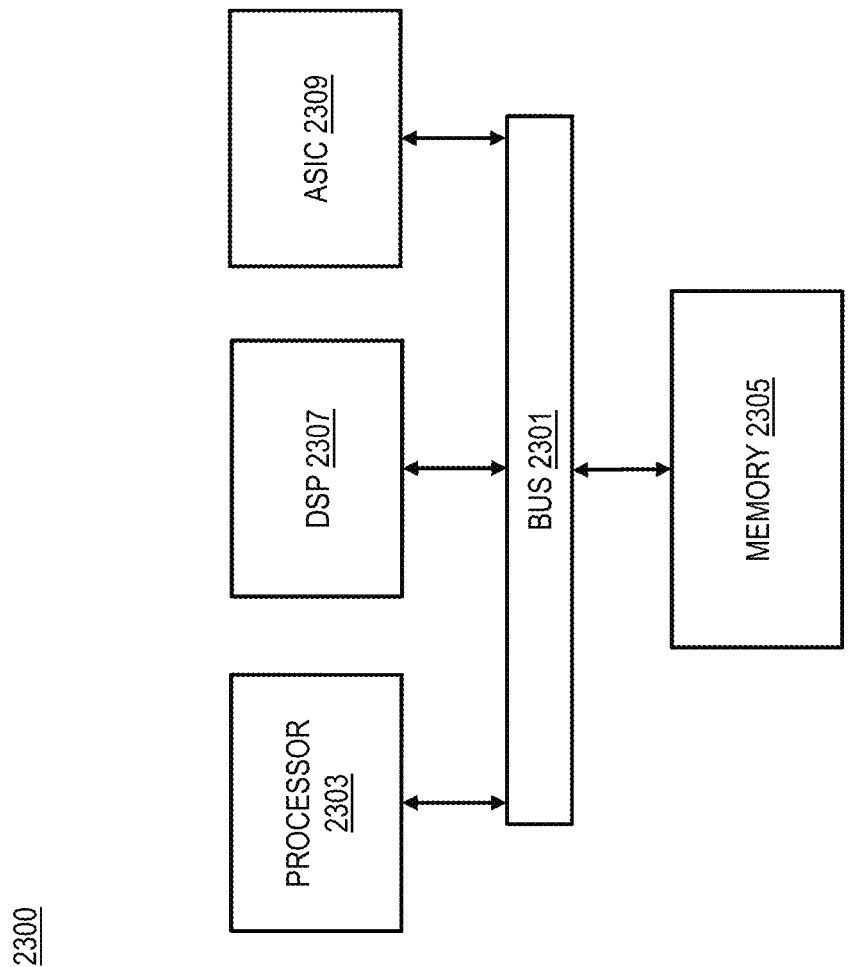
FIG. 23 is a diagram of a chip set that can be used to implement an embodiment of the invention.

FIG. 23 illustrates a chip set or chip 2300 upon which an embodiment of the invention may be implemented. Chip set 2300 is programmed to group and de-overlap items in a user interface as described herein and includes, for instance, the processor and memory components described with respect to FIG. 22 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 2300 can be implemented in a single chip. It is further contemplated that in certain embodiments the chip set or chip 2300 can be implemented as a single "system on a chip." It is further contemplated that in certain embodiments a separate ASIC would not be used, for example, and that all relevant functions as disclosed herein would be performed by a processor or processors. Chip set or chip 2300, or a portion thereof, constitutes a means for performing one or more steps of providing user interface navigation information associated with the availability of functions. Chip set or chip 2300, or a portion thereof, constitutes a means for performing one or more steps of grouping and de-overlapping items in a user interface.

In one embodiment, the chip set or chip 2300 includes a communication mechanism such as a bus 2301 for passing information among the components of the chip set 2300. A processor 2303 has connectivity to the bus 2301 to execute instructions and process information stored in, for example, a memory 2305. The processor 2303 may include one or more processing cores with each core configured to perform independently. A multi-core processor enables multiprocessing within a single physical package. Examples of a multi-core processor include two, four, eight, or greater numbers of processing cores. Alternatively or in addition, the processor 2303 may include one or more microprocessors configured in tandem via the bus 2301 to enable independent execution of instructions, pipelining, and multithreading. The processor 2303 may also be accompanied with one or more specialized components to perform certain processing functions and tasks such as one or more digital signal processors (DSP) 2307, or one or more application-specific integrated circuits (ASIC) 2309. A DSP 2307 typically is configured to process real-world signals (e.g., sound) in real time independently of the processor 2303. Similarly, an ASIC 2309 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 2300 includes merely one or more processors and some software and/or firmware supporting and/or relating to and/or for the one or more processors.

The processor 2303 and accompanying components have connectivity to the memory 2305 via the bus 2301. The memory 2305 includes both dynamic memory (e.g., RAM, magnetic disk, writable optical disk, etc.) and static memory (e.g., ROM, CD-ROM, etc.) for storing executable instructions that when executed perform the inventive steps described herein to group and de-overlap items in a user interface. The memory 2305 also stores the data associated with or generated by the execution of the inventive steps.

Figure 24:
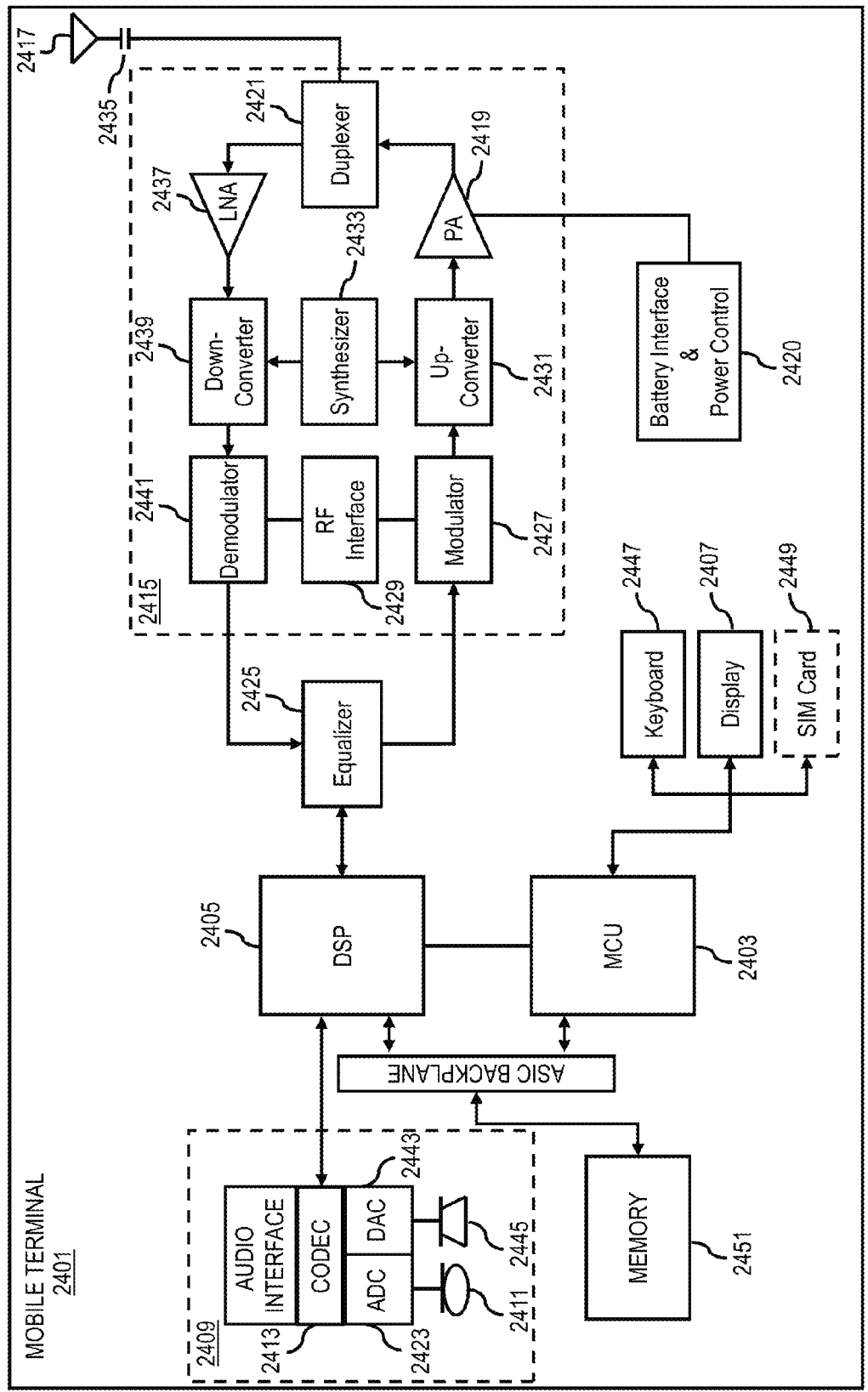
FIG. 24 is a diagram of a mobile terminal (e.g., handset) that can be used to implement an embodiment of the invention.

FIG. 24 is a diagram of exemplary components of a mobile terminal (e.g., handset) for communications, which is capable of operating in the system of FIG. 1, according to one embodiment. In some embodiments, mobile terminal 2401, or a portion thereof, constitutes a means for performing one or more steps of grouping and de-overlapping items in a user interface. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 2403, a Digital Signal Processor (DSP) 2405, and a receiver/transmitter unit including a microphone gain control unit and a speaker gain control unit. A main display unit 2407 provides a display to the user in support of various applications and mobile terminal functions that perform or support the steps of grouping and de-overlapping items in a user interface. The display 2407 includes display circuitry configured to display at least a portion of a user interface of the mobile terminal (e.g., mobile telephone). Additionally, the display 2407 and display circuitry are configured to facilitate user control of at least some functions of the mobile terminal. An audio function circuitry 2409 includes a microphone 2411 and microphone amplifier that amplifies the speech signal output from the microphone 2411. The amplified speech signal output from the microphone 2411 is fed to a coder/decoder (CODEC) 2413.

A radio section 2415 amplifies power and converts frequency in order to communicate with a base station, which is included in a mobile communication system, via antenna 2417. The power amplifier (PA) 2419 and the transmitter/modulation circuitry are operationally responsive to the MCU 2403, with an output from the PA 2419 coupled to the duplexer 2421 or circulator or antenna switch, as known in the art. The PA 2419 also couples to a battery interface and power control unit 2420.

In use, a user of mobile terminal 2401 speaks into the microphone 2411 and his or her voice along with any detected background noise is converted into an analog voltage. The analog voltage is then converted into a digital signal through the Analog to Digital Converter (ADC) 2423. The control unit 2403 routes the digital signal into the DSP 2405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 2425 for compensation of any frequency-dependent impairments that occur during transmission though the air such as phase and amplitude distortion. After equalizing the bit stream, the modulator 2427 combines the signal with a RF signal generated in the RF interface 2429. The modulator 2427 generates a sine wave by way of frequency or phase modulation. In order to prepare the signal for transmission, an up-converter 2431 combines the sine wave output from the modulator 2427 with another sine wave generated by a synthesizer 2433 to achieve the desired frequency of transmission. The signal is then sent through a PA 2419 to increase the signal to an appropriate power level. In practical systems, the PA 2419 acts as a variable gain amplifier whose gain is controlled by the DSP 2405 from information received from a network base station. The signal is then filtered within the duplexer 2421 and optionally sent to an antenna coupler 2435 to match impedances to provide maximum power transfer. Finally, the signal is transmitted via antenna 2417 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 2401 are received via antenna 2417 and immediately amplified by a low noise amplifier (LNA) 2437. A down-converter 2439 lowers the carrier frequency while the demodulator 2441 strips away the RF leaving only a digital bit stream. The signal then goes through the equalizer 2425 and is processed by the DSP 2405. A Digital to Analog Converter (DAC) 2443 converts the signal and the resulting output is transmitted to the user through the speaker 2445, all under control of a Main Control Unit (MCU) 2403 which can be implemented as a Central Processing Unit (CPU) (not shown).

The MCU 2403 receives various signals including input signals from the keyboard 2447. The keyboard 2447 and/or the MCU 2403 in combination with other user input components (e.g., the microphone 2411) comprise a user interface circuitry for managing user input. The MCU 2403 runs a user interface software to facilitate user control of at least some functions of the mobile terminal 2401 to group and de-overlap items in a user interface. The MCU 2403 also delivers a display command and a switch command to the display 2407 and to the speech output switching controller, respectively. Further, the MCU 2403 exchanges information with the DSP 2405 and can access an optionally incorporated SIM card 2449 and a memory 2451. In addition, the MCU 2403 executes various control functions required of the terminal. The DSP 2405 may, depending upon the implementation, perform any of a variety of conventional digital processing functions on the voice signals. Additionally, DSP 2405 determines the background noise level of the local environment from the signals detected by microphone 2411 and sets the gain of microphone 2411 to a level selected to compensate for the natural tendency of the user of the mobile terminal 2401.

The CODEC 2413 includes the ADC 2423 and DAC 2443. The memory 2451 stores various data including call incoming tone data and is capable of storing other data including music data received via, e.g., the global Internet. The software module could reside in RAM memory, flash memory, registers, or any other form of writable storage medium known in the art. The memory device 2451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 2449 carries, for instance, important information, such as the cellular phone number, the carrier supplying service, subscription details, and security information. The SIM card 2449 serves primarily to identify the mobile terminal 2401 on a radio network. The card 2449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   at least one determination of one or more items for rendering in a user interface;
   a determination of one or more rendering locations for one or more representations of the one or more items based, at least in part, on location information associated with the one or more items;
   a grouping, a de-overlapping, or a combination thereof of the one or more representations based, at least in part, on an overlapping of the one or more rendering locations;
   a rendering of the one or more representations in the user interface based, at least in part, on the grouping, the de-overlapping, or a combination thereof;
   a processing of the one or more rendering locations to determine one or more densities of the one or more representations in one or more regions of the user interface; and
   a modification of the one or more rendering locations associated with the one or more representations that are at one or more boundaries of the one or more regions, wherein the modification is based, at least in part, on the one or more densities, criteria for percent of the one or more representations crossing the boundaries, or a combination thereof.

2. A method of claim 1, wherein the (1) data and/or (2) information and/or (3) at least one signal are further based, at least in part, on the following:
   a processing of the location information to cause, at least in part, a sorting of the one or more representations based, at least in part, on a distance of the one or more items associated with the one or more representations from a viewing location.

3. A method of claim 2, wherein the (1) data and/or (2) information and/or (3) at least one signal are further based, at least in part, on the following:
   an association of the grouping with a closest one of the one or more representations from the viewing location based, at least in part, on the sorting; and
   at least one determination to include one or more subsequent ones of the one or more representations in the grouping based, at least in part, on an overlapping with the closest one in the grouping; and
   a rendering of a group representation in the user interface to represent the grouping without rendering the one or more representations associated with individual group members.

4. A method of claim 3, wherein the (1) data and/or (2) information and/or (3) at least one signal are further based, at least in part, on the following:
   an input for selecting the group representation in the user interface;
   a rendering of an expansion of the grouping to present the one or more representations associated with the individual group members.

5. A method of claim 4, wherein the (1) data and/or (2) information and/or (3) at least one signal are further based, at least in part, on the following:
   a rendering the one or more representations associated with the individual group members based, at least in part, on one or more distances of the one or more items associated with the one or more representations from a centroid of the grouping.

6. A method of claim 2, wherein the (1) data and/or (2) information and/or (3) at least one signal are further based, at least in part, on the following:
   at least one determination to select a closest one of the one or more representations from the viewing location as an initial reference for a determination of the de-overlapping;
   a processing of respective areas of a subsequent one of the one or more representations and the initial reference to determine a direction of overlap;
   a modification of the one or more rendering locations associated with the subsequent one based, at least in part, on the direction of overlap; and
   a designation of the subsequent one as a next reference for determining another direction of overlap for another subsequent one of the one or more representations.

7. A method of claim 1, wherein the (1) data and/or (2) information and/or (3) at least one signal are further based, at least in part, on the following:
   at least one determination of an order for processing the one or more regions based, at least in part, on the one or more densities.

8. A method of claim 1, wherein the (1) data and/or (2) information and/or (3) at least one signal are further based, at least in part, on the following:
   a processing of a viewing location associated with the user interface to determine a viewing perspective; and
   a transformation of the one or more representations based, at least in part, on the viewing perspective, the one or more rendering locations, or a combination thereof.

9. A method of claim 1, wherein the (1) data and/or (2) information and/or (3) at least one signal are further based, at least in part, on the following:
   a processing of a viewing location associated with the user interface to determine a viewing perspective;
   one or more features depicted in the user interface, a location-based user interface or a combination thereof; and
   at least one determination of whether the one or more representations are occluded by the one or more features based, at least in part, on the viewing perspective, the one or more rendering locations, or a combination thereof,
   wherein the one or more representations that are occluded are not rendered in the user interface.

10. An apparatus comprising:
    at least one processor; and
    at least one memory including computer program code for one or more programs, the at least one memory and the computer program code configured to, with the at least one processor, cause the apparatus to perform at least the following, determine one or more items for rendering in a user interface;
    cause, at least in part, a determination of one or more rendering locations for one or more representations of the one or more items based, at least in part, on location information associated with the one or more items;
    cause, at least in part, a grouping, a de-overlapping, or a combination thereof of the one or more representations based, at least in part, on an overlapping of the one or more rendering locations;
    cause, at least in part, a rendering of the one or more representations in the user interface based, at least in part, on the grouping, the de-overlapping, or a combination thereof;
    process and/or facilitate a processing of the one or more rendering locations to determine one or more densities of the one or more representations in one or more regions of the user interface; and
    cause, at least in part, a modification of the one or more rendering locations associated with the one or more representations that are at one or more boundaries of the one or more regions, wherein the modification is based, at least in part, on the one or more densities, criteria for percent of the one or more representations crossing the boundaries, or a combination thereof.

11. An apparatus of claim 10, wherein the apparatus is further caused to:
    process and/or facilitate a processing of the location information to cause, at least in part, a sorting of the one or more representations based, at least in part, on a distance of the one or more items associated with the one or more representations from a viewing location.

12. An apparatus of claim 11, wherein the apparatus is further caused to:
    cause, at least in part, an association of the grouping with a closest one of the one or more representations based, at least in part, on the sorting; and
    determine to include one or more subsequent ones of the one or more representations in the grouping based, at least in part, on an overlapping with the closest one in the grouping from the viewing location; and cause, at least in part, a rendering of a group representation in the user interface to represent the grouping without rendering the one or more representations associated with individual group members.

13. An apparatus of claim 12, wherein the apparatus is further caused to:

determine an input for selecting the group representation in the user interface;

cause, at least in part, a rendering of an expansion of the grouping to present the one or more representations associated with the individual group members.

14. An apparatus of claim 13, wherein the apparatus is further caused to:

cause, at least in part, a rendering the one or more representations associated with the individual group members based, at least in part, on one or more distances of the one or more items associated with the one or more representations from a centroid of the grouping.

15. An apparatus of claim 11, wherein the apparatus is further caused to:

determine to select a closest one of the one or more representations from the viewing location as an initial reference for a determination of the de-overlapping;

process and/or facilitate a processing of respective areas of a subsequent one of the one or more representations and the initial reference to determine a direction of overlap;

cause, at least in part, a modification of the one or more rendering locations associated with the subsequent one based, at least in part, on the direction of overlap; and cause, at least in part, a designation of the subsequent one as a next reference for determining another direction of overlap for another subsequent one of the one or more representations.

16. An apparatus of claim 10, wherein the apparatus is further caused to:

determine an order for processing the one or more regions based, at least in part, on the one or more densities.

17. An apparatus of claim 10, wherein the apparatus is further caused to:

process and/or facilitate a processing of a viewing location associated with the user interface to determine a viewing perspective; and cause, at least in part, a transformation of the one or more representations based, at least in part, on the viewing perspective, the one or more rendering locations, or a combination thereof.

18. An apparatus of claim 10, wherein the apparatus is further caused to:

process and/or facilitate a processing of a viewing location associated with the user interface to determine a viewing perspective;

determine one or more features depicted in the user interface, a location-based user interface or a combination thereof; and determine whether the one or more representations are occluded by the one or more features based, at least in part, on the viewing perspective, the one or more rendering locations, or a combination thereof, wherein the one or more representations that are occluded are not rendered in the user interface.

* * * * *